United States Patent
Gervautz et al.

(10) Patent No.: US 9,924,102 B2
(45) Date of Patent: Mar. 20, 2018

(54) IMAGE-BASED APPLICATION LAUNCHER

(71) Applicant: QUALCOMM Incorporated, San Diego, CA (US)

(72) Inventors: Michael Gervautz, Vienna (AT); Gerald V. Wright, Jr., Cardiff, CA (US); Roy Lawrence Ashok Inigo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 489 days.

(21) Appl. No.: 13/804,643

(22) Filed: Mar. 14, 2013

(65) Prior Publication Data

US 2014/0267770 A1 Sep. 18, 2014

(51) Int. Cl.
  *H04N 5/232* (2006.01)
  *H04L 29/08* (2006.01)
  *G06F 9/445* (2018.01)
  *G06F 17/30* (2006.01)

(52) U.S. Cl.
  CPC .......... *H04N 5/23296* (2013.01); *G06F 8/61* (2013.01); *G06F 17/30244* (2013.01); *H04L 67/32* (2013.01)

(58) Field of Classification Search
  CPC ....... H04N 5/23296; H04L 67/32; G06F 8/61; G06F 17/30244
  USPC .......................................... 348/169; 709/219
  See application file for complete search history.

(56) References Cited

U.S. PATENT DOCUMENTS

| | | |
|---|---|---|
| 2007/0083906 A1 | 4/2007 | Welingkar |
| 2007/0228166 A1 | 10/2007 | Lui |
| 2008/0317346 A1* | 12/2008 | Taub .......................... 382/182 |
| 2009/0286570 A1 | 11/2009 | Pierce, Jr. |
| 2010/0056114 A1 | 3/2010 | Roundtree et al. |
| 2010/0157990 A1* | 6/2010 | Krzyzanowski et al. .... 370/352 |
| 2010/0257252 A1* | 10/2010 | Dougherty ......... G06K 9/00979 709/217 |

(Continued)

FOREIGN PATENT DOCUMENTS

| | | |
|---|---|---|
| JP | 2001028010 A | 1/2001 |
| JP | 2001298677 A | 10/2001 |

(Continued)

OTHER PUBLICATIONS

Abowd et al. "Cyberguide: A mobile context-aware tour guide". Wireless Networks 3, 1997, pp. 421-433.*

(Continued)

*Primary Examiner* — Zhihan Zhou

(57) ABSTRACT

Techniques for managing applications associated with a mobile device are provided. The techniques disclosed herein include techniques for obtaining an image of an object in the view of a camera associated with a mobile device, identifying the object in the image based on attributes of the object extracted from the image, and determining whether one or more applications are associated with the object. If there are one or more applications associated with the real-world object, an application associated with the object can be automatically launched on the mobile device. The association between a real-world object and an application may be identified by a visual indicator, such as an icon, symbol, or other markings on the object that indicates that the object is associated with one or more applications.

61 Claims, 10 Drawing Sheets

(56) References Cited

U.S. PATENT DOCUMENTS

| | | | |
|---|---|---|---|
| 2011/0026777 A1* | 2/2011 | Rhoads | G06F 3/017 382/107 |
| 2011/0034176 A1* | 2/2011 | Lord | G06F 17/30244 455/450 |
| 2011/0043628 A1* | 2/2011 | Yun, II | G01S 3/7865 348/143 |
| 2011/0055049 A1* | 3/2011 | Harper | G06F 3/011 705/27.1 |
| 2011/0098024 A1 | 4/2011 | Shin et al. | |
| 2011/0143811 A1* | 6/2011 | Rodriguez | G06K 9/00986 455/556.1 |
| 2011/0197226 A1* | 8/2011 | Hatalkar | H04N 21/435 725/38 |
| 2012/0084292 A1 | 4/2012 | Liang et al. | |
| 2012/0331457 A1* | 12/2012 | Ryu et al. | 717/175 |
| 2013/0083173 A1* | 4/2013 | Geisner et al. | 348/51 |
| 2013/0212160 A1* | 8/2013 | Lawson | G05B 19/4185 709/203 |
| 2013/0288702 A1* | 10/2013 | Abu-Alqumsan et al. | 455/456.1 |
| 2014/0040829 A1* | 2/2014 | Pastor | G06F 1/1686 715/835 |
| 2014/0059458 A1* | 2/2014 | Levien | G06F 3/04842 715/765 |
| 2014/0076965 A1* | 3/2014 | Becorest | G06Q 20/342 235/380 |
| 2014/0129625 A1* | 5/2014 | Haugen | H04W 4/08 709/204 |

FOREIGN PATENT DOCUMENTS

| | | | | |
|---|---|---|---|---|
| JP | 2006106947 A | 4/2006 | | |
| JP | 2009199256 A | 9/2009 | | |
| JP | 2010157207 A | 7/2010 | | |
| JP | 2012203537 A | 10/2012 | | |
| JP | 2012221249 A | 11/2012 | | |
| JP | 2012223566 A | 11/2012 | | |
| WO | 2008041318 A1 | 4/2008 | | |
| WO | WO2012019794 A1 * | 2/2012 | | |
| WO | WO 2012107517 A1 * | 8/2012 | | G06F 1/1686 |
| WO | WO 2014031126 A1 * | 2/2014 | | G06F 3/04842 |

OTHER PUBLICATIONS

International Search Report and Written Opinion—PCT/US2014/020313—ISA/EPO—dated Aug. 12, 2014, 14 pgs.
Digitalbuzz BLOG, "Starbucks: Augmented Reality Xmas Cups," Posted by Aden Hepburn, Nov. 9, 2011 (Retrieved from http://www.digitalbuzzblog.com/starbucks-augmented-reality-xmas-cups/ on Feb. 19, 2013).
Perey Research & Consulting, "Mobile Augmented Reality in Print and Publishing," 2011, (Retrieved from http://www.perey.com/Mobile_AR_in_Publishing.html on Feb. 17, 2013.).
Rohs, "Real-World Interaction with Camera-Phones," in 2nd International Symposium on Ubiquitous Computing Systems (UCS 2004), 10 pages.
Wikipedia, "Barcode," May 2012.
Partial International Search Report—PCT/US2014/020313—ISA/EPO—dated Jun. 4, 2014, 5 pages.
International Preliminary Report on Patentability—PCT/US2014/020313, The International Bureau of WIPO—Geneva, Switzerland, dated Sep. 24, 2015, 10 pgs.
Anonymous. (Feb. 25, 2013). Autorun.inf—Wikipedia, the free encyclopedia. pp. 1-6. Retrieved from https://en.wikipedia.org/w/index.php?title=Autorun.inf&oldid=540380115 [retrieved on Jul. 4, 2016]. XP055285647.

* cited by examiner

Mobile Device

Mobile Device

Visual Search Server

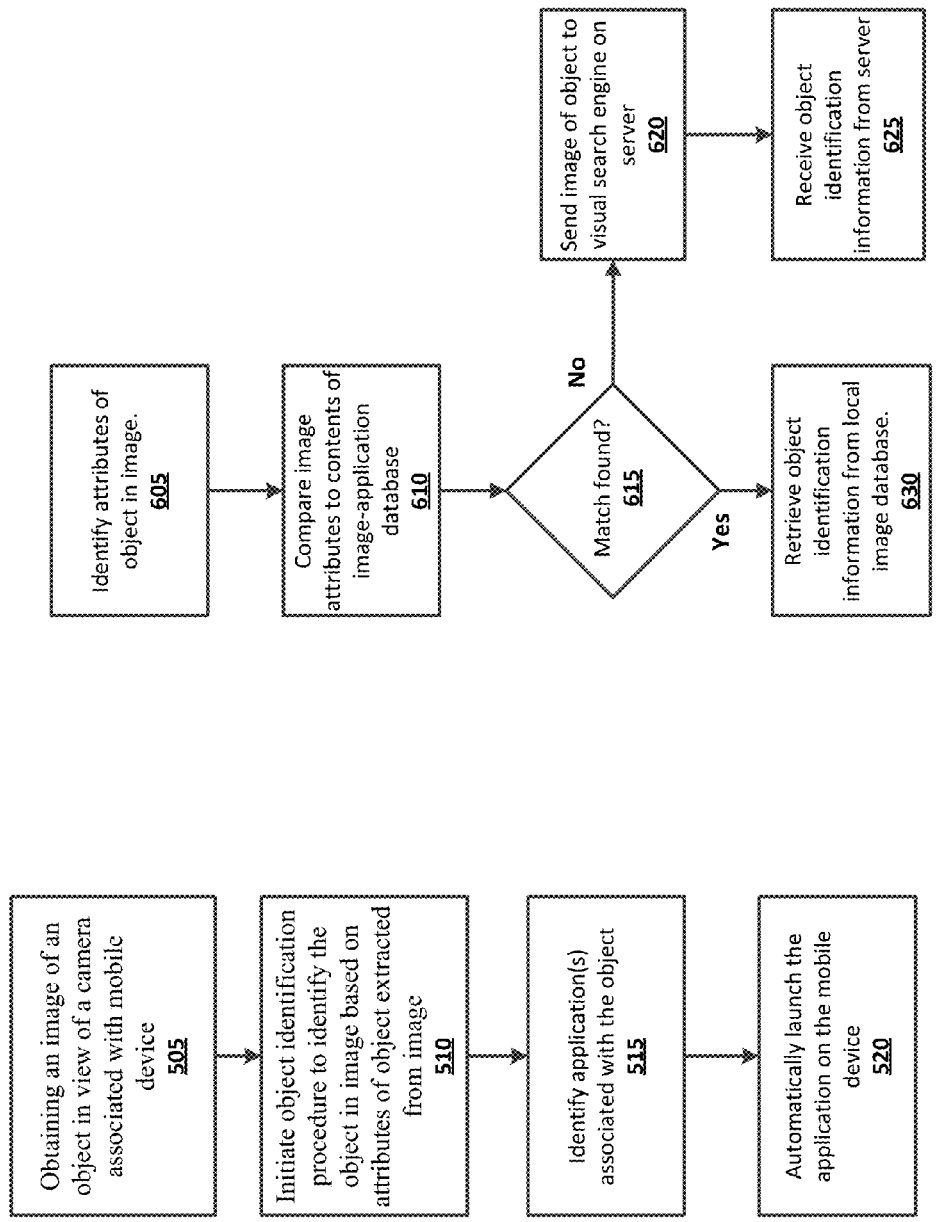

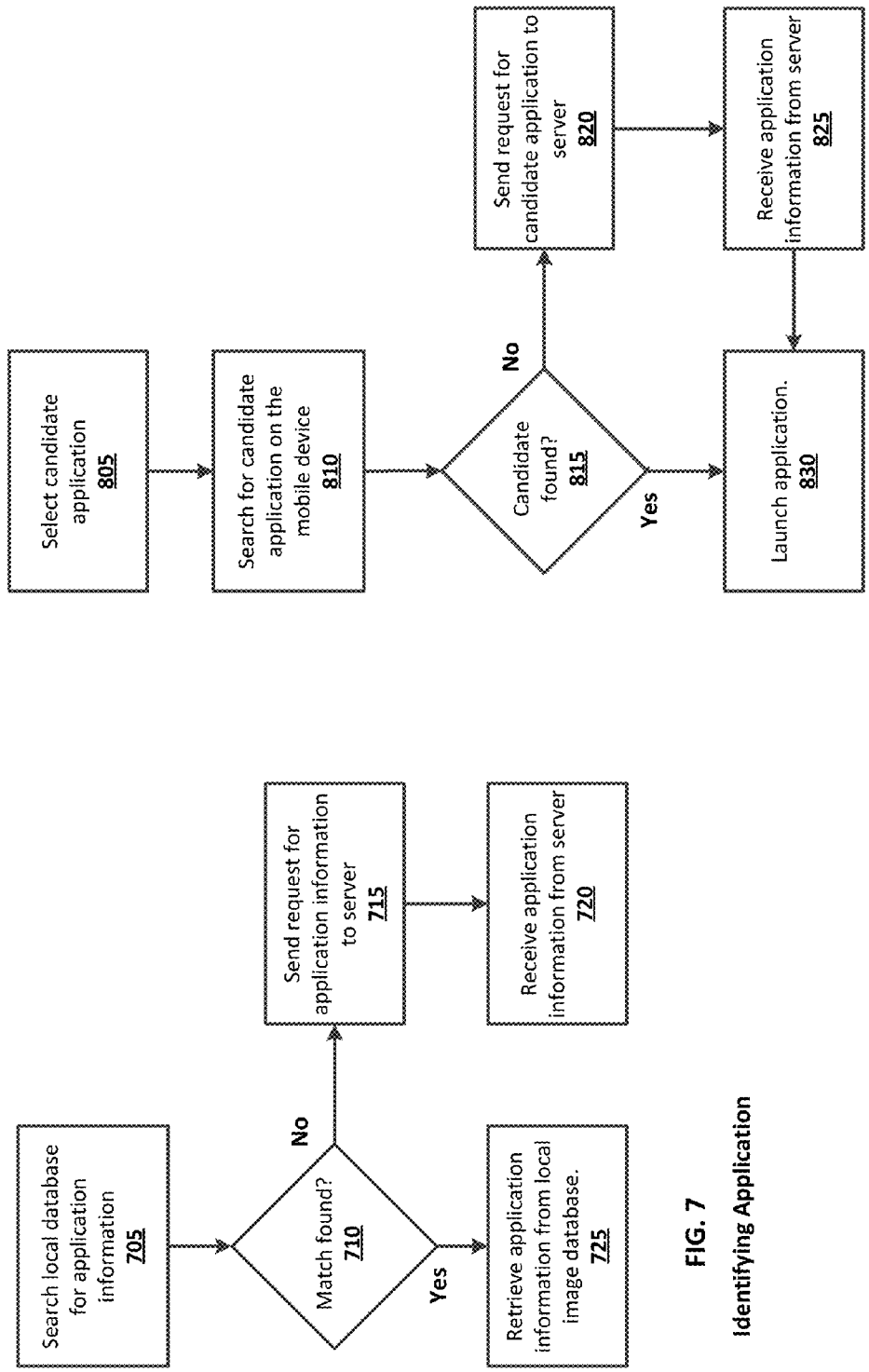

Server identifies object and applications

Selecting Application

Application Portal Server

IMAGE-BASED APPLICATION LAUNCHER

BACKGROUND

Technological advances in mobile devices, such as mobile phones, tablet computers, personal digital assistants, and other such devices, have provided these devices with increased processor power, improved display quality, and the ability to download and run applications. Many mobile devices include cameras that can capture still images, video, or both. Many of the devices are capable of communicating on broadband networks to share content with other devices and to receive multimedia content from the Internet.

SUMMARY

An example of a method for managing applications associated with a mobile device according to the disclosure includes: obtaining an image of an object in view of a camera associated with the mobile device; initiating an object identification procedure to identify the object in the image based on attributes of the object extracted from the image; identifying an application associated with the object based on the object identification procedure; and automatically launching the application on the mobile device.

Implementations of such a method may include one or more of the following features. The object identification procedure includes extracting the attributes from the image and comparing the attributes extracted from the image to attributes associated with objects in a local database stored on the mobile device to identify the object in the image. The attributes associated with objects in the local database are organized into a search tree; and comparing the attributes extracted from the image to the attributes associated with objects included in the local database includes identifying the object in the image based on the attributes extracted from the image and the search tree. Sending the image of the object or the attributes extracted from the image to a visual search engine located on a remote server in response to the object not being identified by comparing the attributes extracted from the image to the attributes associated with objects in the local database; and receiving an identification of the object from the visual search engine located on the remote server. Identifying the application associated with the object includes identifying one or more applications associated with the object in using a local database stored on the mobile device. Initiating the object identification procedure includes sending the image of the object or the attributes extracted from the image to a visual search engine located on a remote server. Identifying the application associated with the object includes receiving information identifying one or more applications associated with the object from the visual search engine. Automatically launching the application includes determining whether the application is installed on the mobile device. Automatically launching the application on the mobile device includes: launching the application if the application is installed on the mobile device; and displaying an interface for acquiring the application if the application is not installed on the mobile device, and launching the application based on input to the interface if the application is acquired. Identifying a plurality of candidate applications associated with the object, and selecting the application from the plurality of candidate applications. Selecting the application from the plurality of candidate applications includes selecting the application based on a user selection. Displaying a listing of the plurality of candidate applications, and prompting a user to provide the user selection from the displayed listing. Displaying the listing of the plurality of candidate applications includes ordering the plurality of candidate applications on the listing according to estimated relevance. Selecting the application from the plurality of candidate applications includes selecting the application based on a user profile. Constructing the user profile based on at least one of user input or observed usage patterns of the mobile device. The application is an augmented reality application.

An apparatus for managing applications associated with a mobile device according to the disclosure includes means for obtaining an image of an object in view of a camera associated with the mobile device; means for initiating an object identification procedure to identify the object in the image based on attributes of the object extracted from the image; means for identifying an application associated with the object based on the object identification procedure; and means for automatically launching the application on the mobile device.

Implementations of such an apparatus may include one or more of the following features. The object identification procedure includes means for extracting the attributes from the image and means for comparing the attributes extracted from the image to attributes associated with objects in a local database stored on the mobile device to identify the object in the image. The attributes associated with objects in the local database are organized into a search tree; and wherein the means for comparing the attributes extracted from the image to the attributes associated with objects included in the local database include means for identifying the object in the image based on the attributes extracted from the image and the search tree. Means for sending the image of the object or the attributes extracted from the image to a visual search engine located on a remote server in response to the object not being identified by comparing the attributes extracted from the image to the attributes associated with objects in the local database, and means for receiving an identification of the object from the visual search engine located on the remote server. The means for identifying the application associated with the object includes means for identifying one or more applications associated with the object in using a local database stored on the mobile device. The means for initiating the object identification procedure includes means for sending the image of the object or the attributes extracted from the image to a visual search engine located on a remote server. The means for identifying the application associated with the object includes means for receiving information identifying one or more applications associated with the object from the visual search engine. The means for automatically launching the application includes means for determining whether the application is installed on the mobile device. The means for automatically launching the application on the mobile device includes: means for launching the application if the application is installed on the mobile device, and means for displaying an interface for acquiring the application if the application is not installed on the mobile device, and launching the application based on input to the interface if the application is acquired. Means for identifying a plurality of candidate applications associated with the object, and means for selecting the application from the plurality of candidate applications. The means for selecting the application from the plurality of candidate applications includes means for selecting the application based on a user selection. Means for displaying a listing of the plurality of candidate applications, and means for prompting a user to provide the user selection from the displayed listing. The means for displaying the listing of the plurality of candidate applications includes means for ordering the plurality of candidate applications on the listing according to estimated relevance. The means for selecting the application from the plurality of candidate applications includes means for selecting the application based on a user profile. Means for constructing the user profile based on at least one of user input or observed usage patterns of the mobile device. The application is an augmented reality application.

An example non-transitory computer-readable medium according to the disclosure, has stored thereon computer-readable instructions for managing applications associated with a mobile device. The instructions are configured to cause a computer to: obtain an image of an object in view of a camera associated with the mobile device; initiate an object identification procedure to identify the object in the image based on attributes of the object extracted from the image; identify an application associated with the object based on the object identification procedure; and automatically launch the application on the mobile device.

Implementations of such a non-transitory computer-readable medium may include one or more of the following features. The code to perform the object identification procedure includes code to cause the computer to extract the attributes from the image and comparing the attributes extracted from the image to attributes associated with objects in a local database stored on the mobile device to identify the object in the image. The attributes associated with objects in the local database are organized into a search tree, and the code to cause the computer to compare the attributes extracted from the image to the attributes associated with objects included in the local database includes code to cause the computer to identify the object in the image based on the attributes extracted from the image and the search tree. Code to cause the computer to: send the image of the object or the attributes extracted from the image to a visual search engine located on a remote server in response to the object not being identified by comparing the attributes extracted from the image to the attributes associated with objects in the local database; and receive an identification of the object from the visual search engine located on the remote server. The code to cause the computer to identify the application associated with the object includes identifying one or more applications associated with the object in using a local database stored on the mobile device. The code to cause the computer to initiate the object identification procedure includes code to cause the computer to send the image of the object or the attributes extracted from the image to a visual search engine located on a remote server. The code to cause the computer to identify the application associated with the object comprises code to cause the computer to receive information identifying one or more applications associated with the object from the visual search engine. The code to cause the computer to automatically launching the application includes code to cause the computer to determine whether the application is installed on the mobile device. The code to cause the computer to automatically launch the application on the mobile device comprises code to cause the computer to: launch the application if the application is installed on the mobile device, and display an interface for acquiring the application if the application is not installed on the mobile device, and launching the application based on input to the interface if the application is acquired. Code to cause the computer to: identify a plurality of candidate applications associated with the object; and select the application from the plurality of candidate applications. The code to cause the computer to select the application from the plurality of candidate applications includes code to cause the computer to select the application based on a user selection. Code to cause the computer to: display a listing of the plurality of candidate applications, and prompt a user to provide the user selection from the displayed listing. The code to cause the computer to display the listing of the plurality of candidate applications includes code to cause the computer to order the plurality of candidate applications on the listing according to estimated relevance. The code to cause the computer to select the application from the plurality of candidate applications includes code to cause the computer to select the application based on a user profile. Code to cause the computer to construct the user profile based on at least one of user input or observed usage patterns of the mobile device. The application is an augmented reality application.

An example apparatus for managing applications associated with a mobile device according to the disclosure includes a transceiver configured to transmit and receive data wirelessly, a non-transitory computer-readable memory; a plurality of modules comprising processor executable code stored in the non-transitory computer-readable memory; and a processor connected to the non-transitory computer-readable memory and configured to access the plurality of modules stored in the non-transitory computer-readable memory. The apparatus also includes an image capture module configured to obtain an image of an object in view of a camera associated with the mobile device, an image identification module configured to initiate an object identification procedure to identify the object in the image based on attributes of the object extracted from the image and to identify an application associated with the object based on the object identification procedure, and an application launcher module to automatically launch the application on the mobile device.

Implementations of such an apparatus can also include one or more of the following features. The image identification module being configured to perform the object identification procedure is configured to extract the attributes from the image and comparing the attributes extracted from the image to attributes associated with objects in a local database stored on the mobile device to identify the object in the image. The attributes associated with objects in the local database are organized into a search tree; and the image identification module being configured to compare the attributes extracted from the image to the attributes associated with objects included in the local database is further configured to identify the object in the image based on the attributes extracted from the image and the search tree. The image identification module is further configured to: send the image of the object or the attributes extracted from the image to a visual search engine located on a remote server in response to the object not being identified by comparing the attributes extracted from the image to the attributes associated with objects in the local database; and receive an identification of the object from the visual search engine located on the remote server. The image identification module being configured to identify the application associated with the object is further configured to identify one or more applications associated with the object in using a local database stored on the mobile device. The image identification module being configured to initiate the object identification procedure is further configured to send the image of the object or the attributes extracted from the image to a visual search engine located on a remote server. The image identification module being configured to identify the application associated with the object is further configured to receive information identifying one or more applications associated with the object from the visual search engine. The application launcher module being configured to automatically launch the application is further configured to determine whether the application is installed on the mobile device. The application launcher module being configured to automatically launch the application on the mobile device is further configured to launch the application if the application is installed on the mobile device; and the apparatus further includes an application acquisition module configured to display an interface for acquiring the application if the application is not installed on the mobile device, and launching the application based on input to the interface if the application is acquired. The image identification module is further configured to identify a plurality of candidate applications associated with the object and to select the application from the plurality of candidate applications. The application launcher module being configured to select the application from the plurality of candidate applications is further configured to select the application based on a user selection. The application launcher module is further configured to display a listing of the plurality of candidate applications and to prompt a user to provide the user selection from the displayed listing. The application launcher module being configured to display the listing of the plurality of candidate applications is further configured to order the plurality of candidate applications on the listing according to estimated relevance. The application launcher module being configured to select the application from the plurality of candidate applications is further configured to select the application based on a user profile. The application launcher module is further configured to construct the user profile based on at least one of user input or observed usage patterns of the mobile device. The application is an augmented reality application.

An example method for identifying an application associated with an image captured by a mobile device according to the disclosure includes: receiving, from the mobile device, information about an image of an object captured by a camera associated with the mobile device; identifying the object based on the information; identifying an application associated with the identified object; and transmitting information to the mobile device including at least an identification of the application associated with the identified object.

Implementations of such a method may include one or more of the following features. The information comprises an image of the object, and the identifying the object includes comparing the image or attributes of the object extracted from the image to contents of an object database to identify the object in the image. The information comprises attributes of the object extracted from the image, and the identifying the object includes comparing the attributes of the object to attributes associated with objects in an object database. Identifying the application associated with the identified object includes sending information associated with the identified object to an application portal server and receiving an application identifier associated with the application from the application portal server, and the application portal server is configured to store a plurality of applications from a plurality of application providers, each application being associated with at least one object and/or object type. The information transmitted to the mobile device includes the application identifier. The information transmitted to the mobile device an instruction to the mobile device to download the application from the application portal server using the application identifier. Requesting executable application content associated with the application associated with the identified object from an application portal server, the request including the application identifier; receiving the executable application content from the application portal server, and where transmitting the information to the mobile device includes transmitting the executable application content to the mobile device.

An example apparatus for identifying an application associated with an image captured by a mobile device according to the disclosure includes: means for receiving, from the mobile device, information about an image of an object captured by a camera associated with the mobile device; identifying the object based on the information; identifying an application associated with the identified object; and transmitting information to the mobile device including at least an identification of the application associated with the identified object.

Implementations of such an apparatus may include one or more of the following features. The information includes an image of the object, and the means for identifying the object includes means for comparing the image or attributes of the object extracted from the image to contents of an object database to identify the object in the image. The information includes attributes of the object extracted from the image, and the means for identifying the object includes means for comparing the attributes of the object to attributes associated with objects in an object database. The means for identifying the application associated with the identified object includes means for sending information associated with the identified object to an application portal server and means for receiving an application identifier associated with the application from the application portal server, the application portal server is configured to store a plurality of applications from a plurality of application providers, each application being associated with at least one object and/or object type. The information transmitted to the mobile device includes the application identifier. The information transmitted to the mobile device includes an instruction to the mobile device to download the application from the application portal server using the application identifier. Means for requesting executable application content associated with the application associated with the identified object from an application portal server, the request including the application identifier, and means for receiving the executable application content from the application portal server, and where transmitting the information to the mobile device includes transmitting the executable application content to the mobile device. The means for identifying an application associated with the identified object includes means for selecting the application from a plurality of applications associated with the identified object.

An example non-transitory computer-readable medium according to the disclosure, has stored thereon computer-readable instructions for identifying an application associated with an image captured by a mobile device. The instructions are configured to cause a computer to: receive, from the mobile device, information about an image of an object captured by a camera associated with the mobile device; identify the object based on the information; identify an application associated with the identified object; and transmit information to the mobile device including at least an identification of the application associated with the identified object.

Implementations of such a non-transitory computer-readable medium may include one or more of the following features. The information includes an image of the object, and the instructions configured to cause the computer to identify the object include instructions configured to cause the computer to comparing the image or attributes of the object extracted from the image to contents of an object database to identify the object in the image. The information includes attributes of the object extracted from the image, and the instructions configured to cause the computer to identify the object include instructions configured to cause the computer to compare the attributes of the object to attributes associated with objects in an object database. The instructions configured to cause the computer to identify the application associated with the identified object include instructions configured to cause the computer to send information associated with the identified object to an application portal server and receive an application identifier associated with the application from the application portal server, the application portal server is configured to store a plurality of applications from a plurality of application providers, each application being associated with at least one object and/or object type. The information transmitted to the mobile device includes the application identifier. The information transmitted to the mobile device an instruction to the mobile device to download the application from the application portal server using the application identifier. Instructions configured to cause the computer to: request executable application content associated with the application associated with the identified object from an application portal server, the request including the application identifier; and receive the executable application content from the application portal server, and where the instructions configured to cause the computer to transmit the information to the mobile device include instructions configured to cause the computer to transmit the executable application content to the mobile device.

An example apparatus for identifying an application associated with an image captured by a mobile device according to the disclosure includes a transceiver configured to transmit and receive data wirelessly; a non-transitory computer-readable memory; and a plurality of modules comprising processor executable code stored in the non-transitory computer-readable memory, and a processor connected to the non-transitory computer-readable memory and configured to access the plurality of modules stored in the non-transitory computer-readable memory. The apparatus also includes a visual search engine module configured to receive, from the mobile device, information about an image of an object captured by a camera associated with the mobile device, identify the object based on the information, identify the object based on the information, identify an application associated with the identified object, and transmit information to the mobile device including at least an identification of the application associated with the identified object.

Implementations of such an apparatus may include one or more of the following features. The information includes an image of the object, and the visual search engine module being configured to identify the object is further configured to compare the image or attributes of the object extracted from the image to contents of an object database to identify the object in the image. The information includes attributes of the object extracted from the image, and wherein the visual search engine module being configured to identify the object is further configured to compare the attributes of the object to attributes associated with objects in an object database. The visual search engine module being configured to identify the application associated with the identified object is further configured to send information associated with the identified object to an application portal server and receive an application identifier associated with the application from the application portal server, the application portal server is configured to store a plurality of applications from a plurality of application providers, each application being associated with at least one object and/or object type. The information transmitted to the mobile device includes the application identifier. The information transmitted to the mobile device includes an instruction to the mobile device to download the application from the application portal server using the application identifier. An application acquisition module configured to: request executable application content associated with the application associated with the identified object from an application portal server, the request including the application identifier; receive the executable application content from the application portal server, and transmit the executable application content to the mobile device. The visual search engine module being configured to identify an application associated with the identified object is further configured to select the application from a plurality of applications associated with the identified object.

An example method for identifying an object associated with an image captured by a mobile device according to the disclosure includes receiving, from the mobile device, information about an image of an object captured by a camera associated with the mobile device; identifying the object based on the information; and transmitting information to the mobile device including at least an identification of the identified object.

Implementations of such a method may include one or more of the following features. The information includes an image of the object, and identifying the object includes comparing the image or attributes of the object extracted from the image to contents of an object database to identify the object in the image. The information includes attributes of the object extracted from the image, and identifying the object includes comparing the attributes of the object to attributes associated with objects in an object database.

An example apparatus for identifying an object associated with an image captured by a mobile device according to the disclosure includes: means for receiving, from the mobile device, information about an image of an object captured by a camera associated with the mobile device; means for identifying the object based on the information; and means for transmitting information to the mobile device including at least an identification of the identified object.

Implementations of such an apparatus may include one or more of the following features. The information includes an image of the object, and the means for identifying the object includes means for comparing the image or attributes of the object extracted from the image to contents of an object database to identify the object in the image. The information includes attributes of the object extracted from the image, and the means for identifying the object includes means for comparing the attributes of the object to attributes associated with objects in an object database.

An example non-transitory computer-readable medium according to the disclosure, has stored thereon computer-readable instructions for identifying an object associated with an image captured by a mobile device. The instructions are configured to cause a computer to: receive, from the mobile device, information about an image of an object captured by a camera associated with the mobile device; identify the object based on the information; and transmit information to the mobile device including at least an identification of the identified object.

Implementations of such a non-transitory computer-readable medium may include one or more of the following features. The information includes an image of the object, and the instructions configured to cause the computer to identify the object include instructions configured to cause the computer to comparing the image or attributes of the object extracted from the image to contents of an object database to identify the object in the image. The information include attributes of the object extracted from the image, and the instructions configured to cause the computer to identify the object include instructions configured to cause the computer to compare the attributes of the object to attributes associated with objects in an object database.

An apparatus for identifying an object associated with an image captured by a mobile device according to the disclosure includes a transceiver configured to transmit and receive data wirelessly; a non-transitory computer-readable memory; a plurality of modules comprising processor executable code stored in the non-transitory computer-readable memory; a processor connected to the non-transitory computer-readable memory and configured to access the plurality of modules stored in the non-transitory computer-readable memory; and a visual search engine module. The visual search engine module is configured to receive, from the mobile device, information about an image of an object captured by a camera associated with the mobile device; identify the object based on the information; and transmit information to the mobile device including at least an identification of the identified object.

Implementations of such an apparatus may include one or more of the following features. The information includes an image of the object, and the visual search engine module being configured to identify the object is further configured to compare the image or attributes of the object extracted from the image to contents of an object database to identify the object in the image. The information includes attributes of the object extracted from the image, and the visual search engine module being configured to identify the object is further configured to compare the attributes of the object to attributes associated with objects in an object database.

An example method for providing application content associated with an object or object type according to the disclosure includes receiving information related to a request for application content from a mobile device or a visual search server; identifying application content associated with the information in an application database, the application database comprising application content associated with a plurality of applications from a plurality of application providers, each application being associated with at least one object and/or object type and a unique application identifier; and transmitting the identified application content to the mobile device or the visual search server.

Implementations of such a method may include one or more of the following features. The information includes an object and/or object type, and the application content comprises a list of application associated with the object and/or object type. The information includes a unique application identifier, and the application content comprises executable application content for the mobile device. The information comprises attributes of an object extracted from an image of the object captured by the mobile device, and the identifying is based on the attributes. The information comprises an identifier of an object, and the identifying is based on the identifier. Receiving from an application provider an identifier of an object or attributes of the object extractable from an image of the object, receiving from the application provider an application associated with the object, storing the identifier or the attributes in the application database, and storing the application in the application database such that the application is associated with the stored identifier or attributes.

An example apparatus for providing application content associated with an object or object type according to the disclosure includes means for receiving information related to a request for application content from a mobile device or a visual search server; means for identifying application content associated with the information in an application database, the application database comprising application content associated with a plurality of applications from a plurality of application providers, each application being associated with at least one object and/or object type and a unique application identifier; and means for transmitting the application content to the mobile device or the visual search server.

Implementations of such an apparatus may include one or more of the following features. The information includes an object and/or object type, and the application content includes a list of application associated with the object and/or object type. The information includes a unique application identifier, and wherein the application content includes executable application content for the mobile device. The information comprises attributes of an object extracted from an image of the object captured by the mobile device, and wherein the means for identifying comprises means for identifying the application content based on the attributes. The information comprises an identifier of an object, and wherein the means for identifying comprises means for identifying based on the identifier. Means for receiving from an application provider an identifier of an object or attributes of the object extractable from an image of the object, means for receiving from the application provider an application associated with the object, storing the identifier or the attributes in the application database, and means for storing the application in the application database such that the application is associated with the stored identifier or attributes.

An example non-transitory computer-readable medium according to the disclosure, has stored thereon computer-readable instructions for providing application content associated with an object or object type. The instructions are configured to cause a computer to: receive information related to a request for application content from a mobile device or a visual search server; identify application content associated with the information in an application database, the application database comprising application content associated with a plurality of applications from a plurality of application providers, each application being associated with at least one object and/or object type and a unique application identifier; and transmit the application content to the mobile device or the visual search server.

Implementations of such a non-transitory computer-readable medium may include one or more of the following features. The information includes an object and/or object type, and the application content includes a list of application associated with the object and/or object type. The information includes a unique application identifier, and the application content includes executable application content for the mobile device. The information comprises attributes of an object extracted from an image of the object captured by the mobile device, and the instructions configured to cause the computer to identify the application content comprise instructions configured to cause the computer to identify the application content based on the attributes. The information comprises an identifier of an object, and the instructions configured to cause the computer to identify the application content comprise instructions configured to cause the computer to identify the application content based on the identifier. Instructions configured to cause the computer to: receive from an application provider an identifier of an object or attributes of the object extractable from an image of the object; receive from the application provider an application associated with the object; store the identifier or the attributes in the application database, and store the application in the application database such that the application is associated with the stored identifier or attributes.

An example apparatus for providing application content associated with an object or object type according to the disclosure includes a transceiver configured to receive information related to a request for application content from a mobile device or a visual search server, an application database comprising application content associated with a plurality of applications from a plurality of application providers, each application being associated with at least one object and/or object type and a unique application identifier; and a processor. The processor is configured to identify application content associated with the information in the application database; wherein the transceiver is further configured to transmit the identified application content to the mobile device or the visual search server.

Implementations of such an apparatus may include one or more of the following features. The information includes an object and/or object type, and the application content includes a list of application associated with the object and/or object type. The information includes a unique application identifier, and the application content includes executable application content for the mobile device. The information comprises attributes of an object extracted from an image of the object captured by the mobile device, and wherein the processor is configured to identify the application content based on the attributes. The information comprises an identifier of an object, and wherein the processor is configured to identify the application content based on the identifier. The processor is further configured to: receive from an application provider an identifier of an object or attributes of the object extractable from an image of the object; receive from the application provider an application associated with the object; store the identifier or the attributes in the application database; and store the application in the application database such that the application is associated with the stored identifier or attributes.

Items and/or techniques described herein may provide one or more of the following capabilities, as well as other capabilities not mentioned.

BRIEF DESCRIPTIONS OF THE DRAWINGS

FIG. 5 is a block flow diagram of a process for managing applications associated with a mobile device.

FIG. 6 is a block flow diagram of a process for identifying an object in an image of an object captured using a camera associated with a mobile device.

FIG. 7 is a block flow diagram of a process for identifying an application associated with an object identified in an image of the object captured by a camera associated with a mobile device.

FIG. 8 is a block flow diagram of a process for launching an application on a mobile device.

DETAILED DESCRIPTION

Techniques for managing applications associated with a mobile device are provided. The techniques disclosed herein include techniques for obtaining an image of an object in the view of a camera associated with a mobile device, identifying the object in the image based on attributes of the object extracted from the image, and determining whether one or more applications are associated with the object. The mobile device can include launcher functionality that allows a user of the mobile device to identify, start, and/or acquire applications, such as augmented reality (AR) applications or other applications, by pointing the camera of the mobile device at a real world object (target). The term "application" as used herein refers to a computing application, i.e., a computer program or computer software component designed to perform a specific task or set of tasks on a mobile device. The application may comprise a set of processor-executable program code that can be executed and/or interpreted by a processor of the mobile device. An application can also be configured to execute one or more routines implemented in the firmware and/or hardware of the mobile device and/or as part of the operating system of the mobile device. In some embodiments, the application is separable from an operating system and/or native functionality of the mobile device. For example, the application may be downloaded, stored, updated, and/or deleted from a mobile device without affecting other operations of the mobile device in some implementations. In some embodiments, the application is not a sub-function or invoked as a sub-process of another operation of mobile device, but rather may be separately selectable and/or activated by a user of the mobile device.

If there are one or more applications associated with the real-world object (also referred to herein as a target), an application associated with the object can be automatically launched on the mobile device. The association between a real-world object and an application may be identified in some embodiments by a visual indicator, such as an icon, symbol, or other markings on the object that indicates that the object is associated with one or more applications or that may be used to search a database for potentially associated applications.

Figure 1:
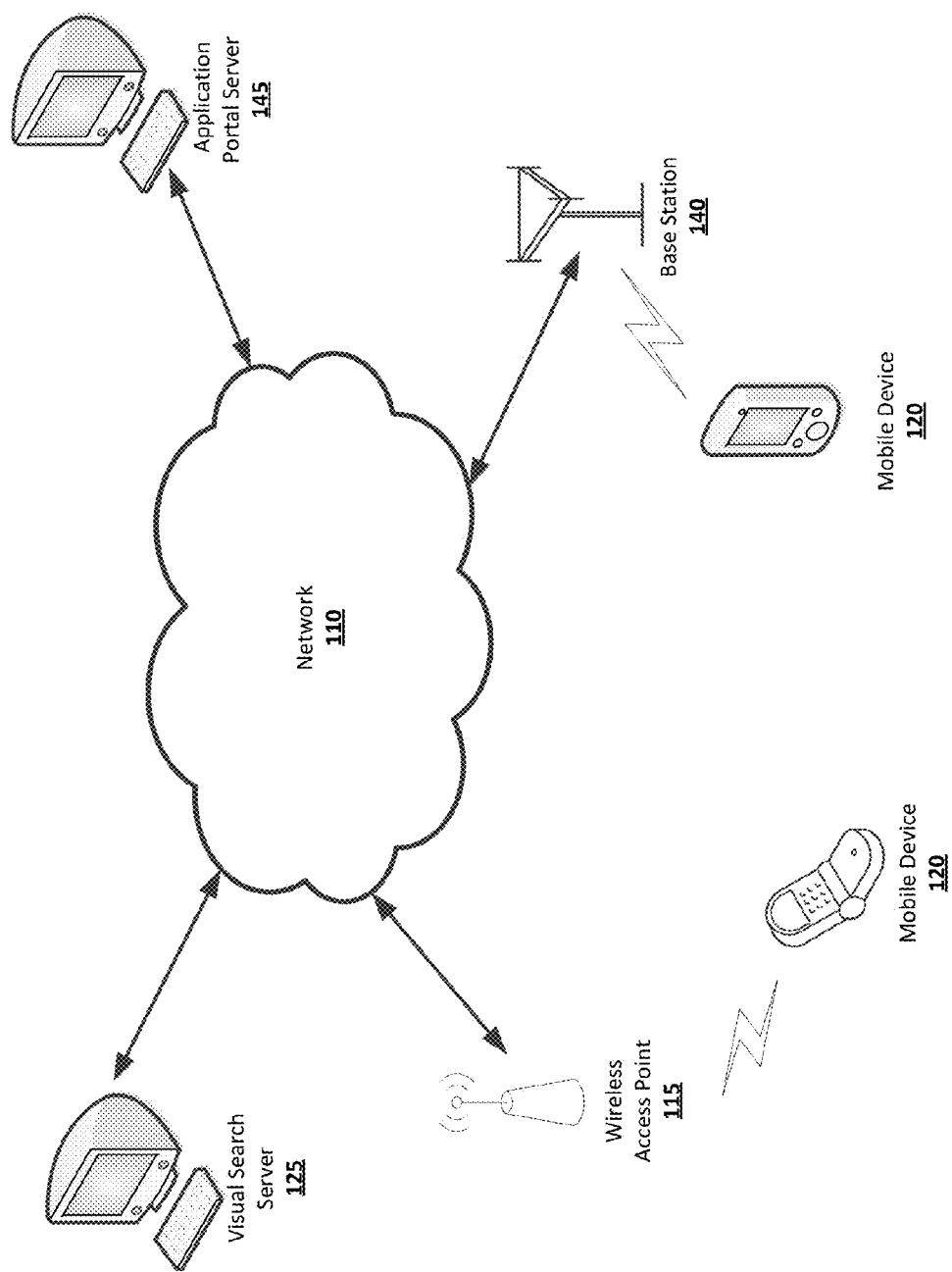
FIG. 1 is a simplified diagram of a wireless communication system.

FIG. 1 is a simplified diagram of a wireless communication system in which the techniques for managing applications associated with a mobile device can be implemented. In the example illustrated in FIG. 1, the wireless network environment includes a wireless access point 115, a base station 140, a plurality of mobile devices 120, a network 110, a visual search server 125, and an application portal server 145.

The example network environment illustrated in FIG. 1 includes a single wireless access point 115, but other network environments that can be used to implement the techniques disclosed herein may include either more or less wireless access points. The term "access point" is used for simplicity, but refers to communication devices, more generally, one example of which include access points in wireless local area networks, such as IEEE 802 series compliant networks including the IEEE 802.11 family of standards commonly referred to as Wi-Fi. For example, devices that use Bluetooth can be communication devices according to the disclosure. As such, the usage of the term access point is not exclusive of other kinds of communication networks. Furthermore, a wireless access point 115 can be configured to implement other wireless communications standards in addition or instead of standards from the IEEE 802 series. The wireless access point 115 can also be implemented as a femtocell that is configured to operate a base station for a mobile communications network. A wireless access point 115 can either be located at a fixed location or may be mobile. For example, a wireless access point 115 can be a mobile device that is configured to provide a WiFi hotspot and is configured to wirelessly connect to a mobile communication network, e.g. a WAN to provide network connectivity to the WiFi hotspot.

The base station 140 is configured to wirelessly communication with a plurality of mobile devices, such as mobile devices 120. The base station 140 can be associated with a mobile communications network provider and can be configured to communicate using one or more wireless communications protocols for mobile devices. For example, the base station 140 can be configured to use on more of the wireless communications protocols, such as Code Division Multiple Access (CDMA), Time Division Multiple Access (TDMA), Frequency Division Multiple Access (FDMA), Orthogonal FDMA (OFDMA), and Single-Carrier FDMA (SC-FDMA), Long Term Evolution (LTE), and/or other wireless communications protocols. For example, the base station 140 can be an evolved Node B (eNB) in a wireless communication system implanting the LTE wireless communications standards. The wireless communications discussed herein are only examples of some of the types of wireless protocols that may be implemented by the base station 140, and are not intended to limit the techniques discussed herein to wireless communication networks using these protocols.

The example network environment illustrated in FIG. 1 also includes two mobile devices 120, but other network environments that can be used to implement the techniques disclosed herein may include either more or less mobile devices. The mobile devices 120 can be configured to communicate with one or more visual search servers 125 and/or application portal servers 145, for example, through one of the wireless access point 115 or the wireless base station 140. The visual search server 125 can be configured to perform searches on image content and/or descriptors, keypoints, and/or other information or attributes associated with an image received from the mobile device 120 and to attempt to identify the objects in the image. The visual search server 125 can provide the identity of the object in the image to the mobile device 120 and/or provide other information or attributes associated with such an object to the mobile device 120 in response to a request from the mobile device 120. The visual search server 125 can also be configured to associate one or more applications with an object and to provide application identifiers associated with those applications to the mobile device 120. The visual search server 125 can also be configured to obtain executable application content associated with the identified applications to the mobile device 120 and can be configured to obtain the application content from the application portal server 145. The application portal server 145 can be configured to allow application developers to register applications and to associate the applications with descriptors, keypoints, and/or other information or attributes that can be used to associate the applications with objects and/or types of objects. The application portal server 145 can provide the association between the descriptors, keypoints, and/or other information or attributes that can be used to associate the applications with objects and/or types of objects with the application identifiers of one or more applications, and the visual search server 125 can use this information to select one or more applications to be provided to and/or launched on the mobile device 120. An example implementation of a visual search server 125 is provided in FIG. 4 and an example implementation of an application portal 145 is provided in FIG. 11. In other implementations, one or more functions of the visual search server 125 and the application portal server 145 can be combined onto a single server or set of servers. In other implementations, the network environment may contain other servers (not shown) that can also be configured to provide information and/or electronic content to the mobile devices 120.

Figure 2:
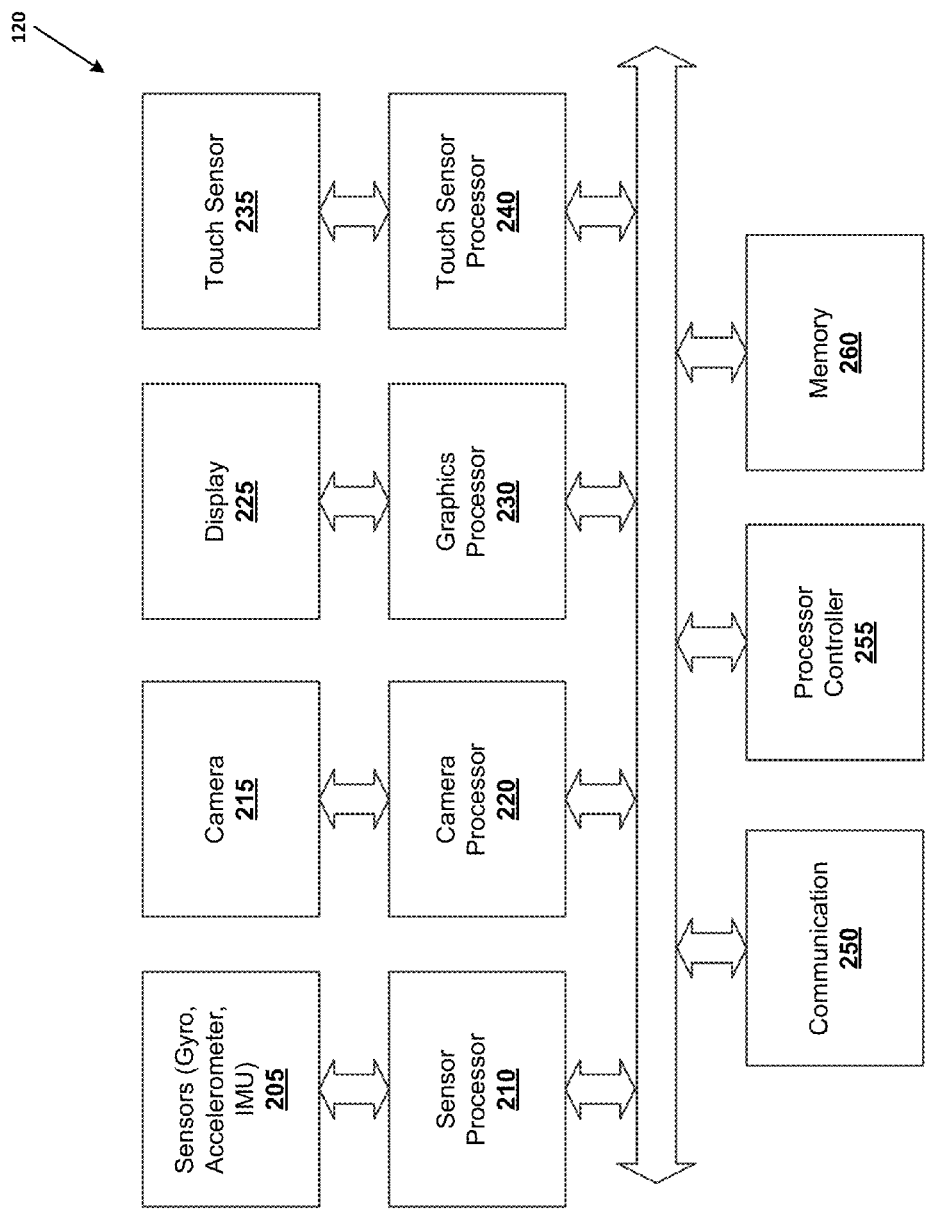
FIG. 2 is a functional block diagram of a mobile device that can be used to implement the mobile stations illustrated in FIG. 1.

FIG. 2 is an example of a system architecture that can be used to implement a mobile device, such as the mobile devices 120 illustrated in FIG. 1. A mobile device 120 may include some or all of the components illustrated in FIG. 2 and may include additional components not illustrated in FIG. 3 and can be configured to implement various functions, such as at least some of the stages the processes illustrated in FIGS. 5-9 described in detail below. In some embodiments, a mobile device 120 may omit one or more of the components illustrated in FIG. 2. The mobile device 120 can be a mobile phone, tablet computers, personal digital assistant, or other such portable computing device.

The mobile device 120 can include sensors 205 (e.g., gyros, accelerometers, an inertial measurement unit (IMU) and/or other types of sensors) and a sensor processor 210 for processing data collected by the sensors 205. Data collected by the sensors may be used to determine an orientation of the mobile station, acceleration or velocity of the mobile station, and/or other information, for example that may be useful in determining the location of the mobile device 120. The data collected by the sensor 205 can also be used to provide inputs to one or more applications on the mobile device 120, including the positioning engine used to determine at location of the mobile device 120.

The mobile device 120 can also include a camera 215 and a camera processor 220. The camera 215 can be configured to capture images and/or video content. The camera processor 220 can be configured to process the data collected by the camera 215 and to convert the data collected by the camera into a format that can be used by one or more applications on the mobile device 120 and/or viewed on the display 225 of the mobile device 120. The camera processor 220 can be configured to perform various types of image or video processing on the data collected from the camera to prepare the content for display on display 225.

The display 225 can be a touch screen interface that includes touch sensor 235. The graphics processor 230 can be used to generate graphical data for display on display 225. Applications on the mobile device 1200 and/or other executable programs, such as the operating system and the positioning engine, can be implemented in software and/or hardware and can be configured to send commands to the graphics processor 230 to display image or video content on the display 225. Touch sensor processor 240 can process data output by the touch sensor 235 to identify when a user touches the touch screen. The touch sensor processor 240 can be configured to identify various touch gestures, including multi-finger touches of the touch screen. An operating system, applications, and/or positioning engine can use the gesture information determined by the touch sensor processor 240 to determine, at least in part, receive and respond to user input.

In some implementations, the display 225 can comprise a head-mounted display (HMD) that can be worn by the user of the mobile device 120. In such an implementation, the display 225 may be implemented as a separate unit that is worn on the head of the user and that can be connected to other components of the mobile device 120 via a wired and/or wireless connection. The display 225 can be configured to provide an optical see-through component that includes a transparent or semi-transparent component through which a user of the HMD may obtain a real-world view of objects within the field of view of the HMD and the HMD can be configured to overlay augmented reality content over the real-world view of the objects in the field of view of the HMD. In some implementations, where the display 225 comprises a HMD, the camera 215 can be mounted such that the field of view of the camera 215 is aligned with that of a user of the HMD such that the field of view of the camera 215 can capture at least a portion of the field of view of a user of HMD.

The communications controller 250 may include one or more wireless transmitters, receivers, transceivers, etc. that enable the mobile device 120 to communicate using one or more wireless protocols. The communications controller 250 can be configured to allow the device to send and receive data from nearby wireless devices capable of communicating wirelessly. For example, the communications controller 250 can be configured to enable the mobile device 120 to communicate either directly or indirectly with the wireless access point 115, the base station 140, and the server 125, and/or other mobile devices 120. The communications controller 250 can also be configured to enable the mobile device 120 to receive navigation signals that the mobile device 120 can use to determine its location. For example, the communications controller 250 can be configured to receive signals from satellite vehicles (SVs) belonging to one or more Satellite Positioning Systems (SPSs), such as the GPS system, the GLONASS system, the Galileo system, and/or other SPSs. The communications controller 250 can be configured to use on more of the wireless communications protocols, such as Code Division Multiple Access (CDMA), Time Division Multiple Access (TDMA), Frequency Division Multiple Access (FDMA), Orthogonal FDMA (OFDMA), and Single-Carrier FDMA (SC-FDMA), Long Term Evolution (LTE), and/or other wireless communications protocols. The communications controller 250 can also be configured to allow the mobile device 120 send and/or receive data wirelessly using one or more other wireless protocols, such as Bluetooth, ZigBee, WiFi, WiMax and/or other wireless communications protocols.

The memory 260 includes volatile and/or persistent non-transitory memory for storing data used by various components of the mobile device 120. The memory 260 can be used to store processor-executable program code for one or more of the processors included in the device.

The processor controller 255 can be configured to control one or more of the sensor processor 210, camera processor 220, the graphics processor 230, and the touch sensor processor 240. One or more of the sensor processor 210, camera processor 220, the graphics processor 230, and the touch sensor processor 240 may also be implemented by the processor controller 255. The processor controller 255 can also be configured to execute processor-executable program code. While the particular example implementation of the mobile device 120 illustrated in FIG. 2 includes multiple processors 210, 220, 230, 240 and the processor controller 255, some or all of the processors 210, 220, 230, 240 and/or the processor controller 255 can be implemented by a general purpose processor or central processing unit (CPU). Furthermore, at least a portion of the functionality of the processors 210, 220, 230, 240 and the processor controller 255 can be implemented as processor-executable program code stored in the memory 260 of the mobile device 120.

Figure 3:
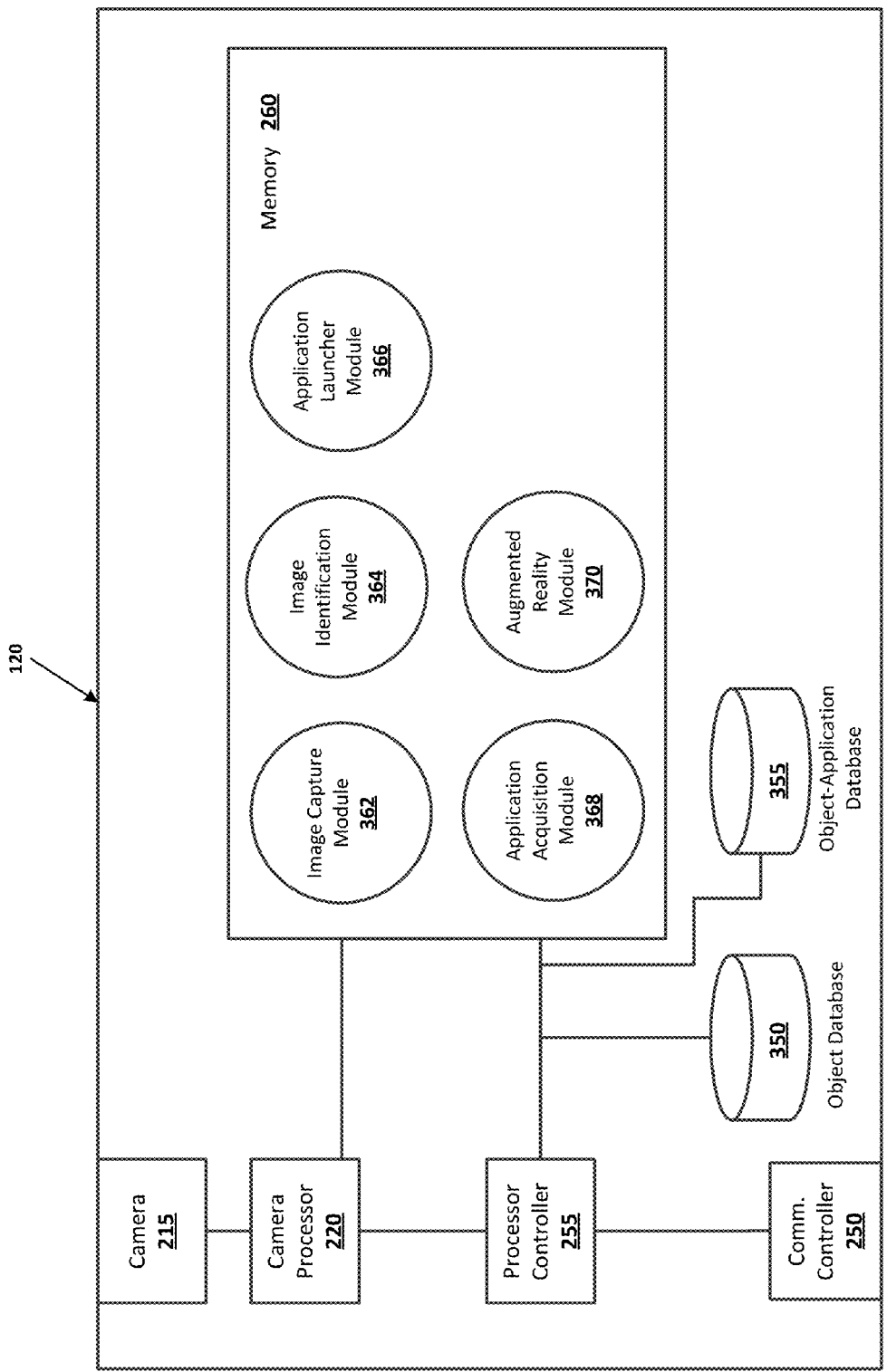
FIG. 3 is a functional block diagram of the mobile station illustrated in FIG. 1 that illustrates functional modules of a memory shown in FIG. 2.

FIG. 3 is a functional block diagram of the mobile station illustrated in FIG. 1 that illustrates functional modules of a memory shown in FIG. 2. For example, the mobile device 120 can include an image capture module 362, an image identification module 364, an application launcher module 366, an application acquisition module 368, and an augmented reality module 370. The image capture module 362, the image identification module 364, the application launcher module 366, the application acquisition module 368, and/or the augmented reality module 370 can alternatively be implemented by a general purpose processor or CPU and/or in other hardware rather than being implemented as processor-executable program code in the memory 260.

The mobile device 120 can include an object database 350 and an object-application database 355. The object database 350 and the object-application database 355 can be implemented in the memory 260 of the mobile device 120 and/or may be implemented in another non-transitory, persistent memory of the mobile device 120. The object database 350 and the object-application database 355 may be stored in a removable computer-readable medium associated with the mobile device 120, such as a flash memory, a SD-Card, or other type of removable memory.

The image capture module 362 can be configured to capture an image of an object within the field of view of the camera 215 of the mobile device 120. The image capture module 362 can be configured to capture the image of the object within the field of view of the camera 215 in response to the user a user command, such as the user pressing an image capture button on the camera or the user speaking a voice command. The image capture module 362 can also be configured to automatically capture an image of an object within the field of view of the camera 215 of the mobile device 120. For example, the image capture module 362 can be configured to periodically capture an image of an object in the field of view of the camera 215 of the mobile device 120.

The image capture module 362 can also be configured to capture a series of images and/or to capture video content using the camera 215 of the mobile device 120. The image capture module 362 can be configured to extract one or more images from video content captured by the camera 215 of the mobile device. The image capture module 362 can be configured to provide the captured images to the image identification module 364 to provide the image identification module 364 the opportunity to identify one or more objects within the image or images captured by the camera 215 of the mobile device 120.

The image identification module 364 can be configured to identify an object included in an image or in video content captured by the camera 215 of the mobile device 120. The image identification module 364 can be configured to automatically attempt to identify objects in an image captured by the camera 215 of the mobile device 120, can be triggered by a user command or input to identify an object, or can be automatically triggered when an icon, symbol, or other markings on an object is recognized by the image identification module 364. The image identification module 364 can be configured to recognize certain icons, symbols, or other markings that indicate that an object on which the icon, symbol, or other marking is visible is associated with one or more applications that can be executed on the mobile device 120. If such an icon, symbol, or other marking is identified in an image captured by the camera 215, the image identification module 364 can be configured to identify the object that is associated with the icon, symbol, or other marking. The image identification module 364 can be configured such that the icon, symbol, or other marking associated with a real-world object does not convey any information that identifies the object and/or applications associated with the object, but instead, the icon, symbol, or other marking notifies the image identification module 364 that there are one or more applications associated with that object.

The image identification module 364 can also be configured to identify objects that do not include an icon, symbol, or other markings on the objects. For example, the image identification module 364 can be configured to be triggered by a user command or input to identify an object within the field of view of the camera 215 of the mobile device 120. The image identification module 364 can be configured to automatically scan for and detect objects within the field of view of the camera 215 of the mobile device. For example, the image identification module 364 can be configured to receive video content and/or image content captured by the camera 215 as a user of the mobile device 120 points the camera at and/or pans the camera across objects and to attempt to detect and identify objects in the field of view of the camera 215. In one example implementation, the mobile device 120 can include an HMD and the mobile device 120 can be configured to automatically download and/or launch applications for objects within the field of view of the HMD. In this way, the user may easily discover and/or launch applications associated with any of a variety of objects that may be near the user and/or visible to the user.

The image identification module 364 can be configured to instruct the augmented reality module 370 to display augmented reality content on the display 225 of the mobile device when the image identification process is triggered. For example, if the image identification module 364 identifies an icon or other marking that triggers the object identification process, the image identification module 364 can be configured to display an animation or other augmented reality content to indicate to the user that there are one or more applications associated with the real-world object and/or that the process of identifying the object and the associated applications has been initiated. For example, the augmented reality module 370 can be configured to animate the icon, symbol, or other marking recognized on an object that may be associated with one or more applications.

The image identification module 364 can also be configured to compare the image of an object to the contents of the object database 350 to identify the object and/or object type of an object in the image and to identify which, if any, applications are associated with the object and/or object type in the image. The image identification module 364 can be configured to identify and/or extract attributes, descriptors, keypoints, and/or other information associated with an the object in the image and to compare the attributes of the object in the image to the attributes of objects stored in the object-application database 350 to identify the object captured by the camera 150.

The image identification module 364 can be configured to use various techniques to identify the object in the image. For example, the image identification module 364 can be configured to use one or more methods for object recognition that use natural feature descriptors to describe an object and that search for similar features in an image of an object to attempt to identify the object. The image identification module 364 can be configured to identify an object in an image when more than a threshold number of features associated with a known object match features in an image captured by the camera 215 of the mobile device. Thus, the attributes identified and/or extracted by the image identification module 364 may comprise features, descriptors, keypoints, and/or other information or attributes from an image.

One technique that the image identification module 364 can use is a scale-invariant feature transform (SIFT) technique to derive natural feature descriptors from the image of the object and compare those features to feature descriptors of known objects, which can be stored in the object database 350 on the mobile device. The SIFT technique generally selects features that should not change from one image to another of the same object that can later be used to identify that object in an image of the object. For example, the feature descriptors can be selected such that changes in image scale between the image captured by the camera 215 associated with the mobile device 120 and the reference images of objects used to build the database do not interfere with the ability of the image identification module 364 to recognize the object. The feature descriptors can also be selected so that the ability of the image identification module 364 to recognize the object in the image captured by the camera 215 if not affected by differences in illumination between the image captured by the camera 215 and the reference images used to create to build the database. The feature descriptors can also be selected such that the orientation of the object in the image captured by the camera 215 and the reference images can different without affecting the ability of the image identification module 364 to recognize the object.

Another technique that the image identification module 364 can use is the Speeded Up Robust Features (SURF) technique for identifying local features of an object that can then be used to identify the object image of that object. Yet another technique that the image identification module 364 can use is the Binary Robust Independent Elementary Features (BRIEF) technique for identifying an object in an image.

The object database 350 can be organized into an efficient search data structure, such as a search tree, hash table, or other type of search data structure, such that the image identification module 364 can identify a single object or type of object from the object-application database 350 that is most likely to represent the object in the image captured by the camera 215 of the mobile device 120. The image identification module 364 can be configured to traverse the efficient search data structure of the object database 350 to compare natural feature points associated with the descriptors to identify an object from the database that has enough feature points associated with the object that match feature points extracted from the image of the object captured by the camera 215. The image identification module 364 can be configure to select an object from the object database 350 that matches over a threshold number of feature points extracted from the image captured by the camera 214.

Figure 11:
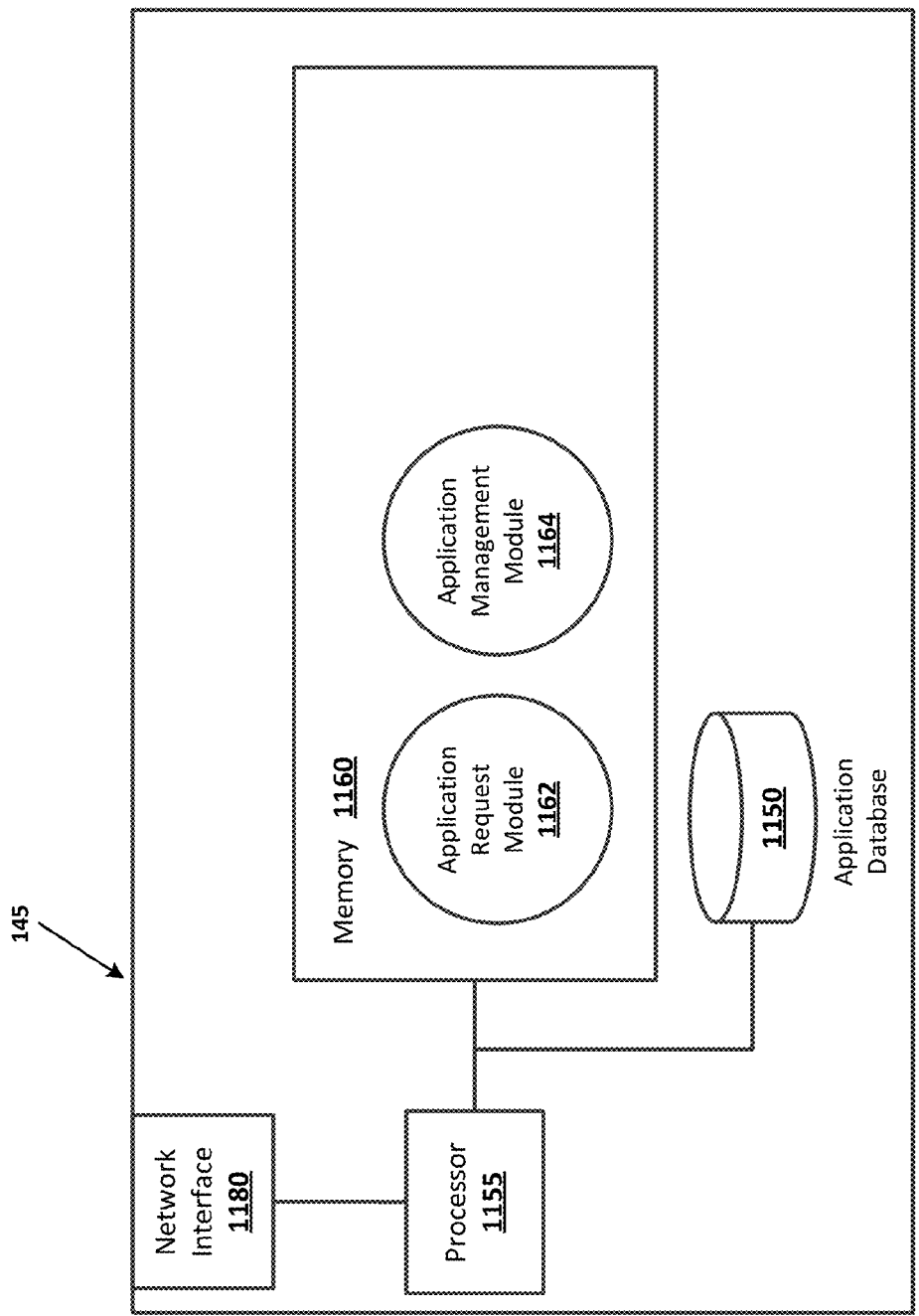
FIG. 11 is a block diagram of a computer system that can be used to implement the application portal server illustrated in FIG. 1.

The image identification module 364 can be configured to select one or more applications associated with an object or a type of object by searching the object-application database 355 and/or obtaining the application content from the application portal server 145 directly or indirectly through the visual search server 125. The object application-database 355 can be configured to provide a mapping between objects and/or types of objects and applications associated with those objects. The association between an application and an object and/or type of object can be made by the developer of the application and can be defined using the application portal server 145. An example implementation of an application portal server 145 is illustrated in FIG. 11 and is discussed in detail below. In some implementations, content in the object-application database 355 may be added by the manufacturer of the mobile device and/or by a wireless network provider associated with the mobile device 120. The mobile device 120 can also be configured to periodically query the application portal server 145 for updates to the information included in the object-application database 355. The application portal server 145 can also be configured to push updates to the content in the object-application database to the mobile device 120 in response to updates to the mappings between objects and/or object types and applications.

The image identification module 364 can be configured to use the identity of an object and/or type of object identified in an image captured by the camera of the mobile device 120 to select one or more applications from the application database 355. The identification of the object and/or type of object may have been performed by the image identification module 364 or by the visual search server 125 in response to a request from the image identification module 364.

The object-application database 355 can include data associating the application identifiers of one or more applications with various objects and/or object types, and the image identification module 364 can be configured to use the identity of the object in an image and/or the type of object to select one or more applications associated with that object or type of object from the object-application database 355.

The image identification module 364 can be configured to select different hierarchies of applications that match the object and/or type of object with multiple hierarchies of applications that include content that may be of interest to the user of the mobile device. For example, if the user of the mobile device takes a picture of Mount Rainier, the image identification module 364 may be able to identify that that image is of Mount Rainer based on the information available to the image identification module 364 and/or the visual search server 125. The image identification module 364 can be configured to select application content that is associated only with Mount Rainier or can be configured to select additional content that may also be of interest to the user of the mobile device 120. For example, the mobile device 120 can be configured to select additional content related to mountains in the state of Washington, mountains in general, and/or related to mountain activities, such as hiking, mountaineering, and camping. The image identification module 364 and/or the visual search server 125 may also identify the image as an image of a mountain but be unable to identify the exact object captured in the image, and the image identification module 364 could select applications that include content related to mountains in general and/or for information for mountain-related activities, such as hiking, mountaineering, and camping. The image identification module 364 can be configured to select application content associated with multiple levels of hierarchical information. For example, if the user captures an image of the Empire State Building in New York City with the camera 215 of the mobile device 120, the image identification module 364 can be configured to select applications that are associated with the Empire State Building itself as well as related applications at different hierarchical levels. For example, the image identification module 364 can be configured to select application content associated with skyscrapers having viewing platforms in Manhattan at one broader hierarchical level, and application content associated with landmarks in New York City at an even broader hierarchical level. The hierarchical levels can be used by the application launcher module 366 to determine the order to present the applications if a list of applications is presented to the user of the mobile device 120.

The image identification module 364 can also be configured to use the location of the mobile device when attempting to identify an object in an image captured by the camera 215 of the mobile device 120 and can also take into account the location when selecting applications from the object-application database 355 and/or obtaining application information from the application portal server 145.

The object database 350 and/or the object-application database 355 can be populated with information at some point before the mobile device 120 is provided to the customer, e.g., by the manufacturer of the device or by service provider providing wireless network services to the mobile device. The object-application database 355 can also be populated by one or more applications installed on the mobile device 120. The object database 350 can also be populated with data provided by the visual search server 125 and the object-application database 355 can be populated with executable application context from the application portal server 145 that is suitable for execution on the mobile device 120. For example, the server 125 can be configured to provide data to the mobile device 120 for identifying objects that may have one or more applications associated with those objects. The object database 350 and the object-application database 355 can also be used to implement caches that can be used to store recently identified objects and/or applications and the contents of the cache can be searched for recent objects and/or applications that the image identification module 364 can be configured to search prior to sending a request to the server to identify an object and/or to identify applications associated with the object.

The image identification module 364 can also be configured to send images captured by the camera 215 to the server 125 for identification. The server 125 can be configured to identify objects in images sent by the image identification module 364 and/or to identify one or more applications associated with the object in the image and to provide information identifying the object and/or the applications to the image identification module 364. The image identification module 364 can also be configured to send attributes and/or features extracted from images of objects to the server 125 in addition to or instead of the images. The server 125 can be configured to use the attributes and/or features extracted from images of objects in addition to or instead of the images when identifying the objects in the images.

The augmented reality module 370 can be configured to display augmented-reality content on the display 225 of the mobile device 120. For example, the augmented reality module 370 can be configured to overlay augmented reality content over real-world content displayed on the display 225 of the mobile device 120. The augmented reality module 370 can be configured to display augmented reality content overlaid on a still image, a series of images, or video content captured by the camera 215 of the mobile device. In one example, the mobile device 120 can include an application that displays a real-world scene within the field of the view of the camera 215 and the augmented reality module 370 can be configured to provide augmented reality content that can be displayed over the real-world scene. The augmented reality module 370 can be configured to generate content that can overlay an object on the real-world scene, such as an animated figure that overlays an inanimate object such as a toy in the real-world scene. The augmented-reality content can also include informational overlays, such as maps, identifiers of points of interest, and other information associated with objects within the real-world scene being displayed on the display 225. The augmented-reality content can also apply filters to portions of the real-world scene to alter the appearance of one or more real-world objects. For example, the augmented-reality content can include a filter to change the saturation of the colors of a real-world object and/or change the contrast of the real-world object.

The application launcher module 366 can be configured to launch an application associated with a real-world object that has been identified by the image identification module 364. An object may have multiple applications that have been associated with that object. For example, a candy bar might have a game application and map application associated with the candy bar. The game application allows the user of the mobile device to play a game that may be tied to the marketing of the candy bar or to content associated with a third party that has entered into a marketing agreement with the producer of the candy bar. The map application associated with the candy bar can be configured to provide a list of retailers proximate to the mobile device 120 that sell the candy bar and/or other products produced by the producer of the candy bar.

The application launcher module 366 can be configured to prompt to the user of the mobile device 120 to select an application to be automatically launched if there are multiple applications associated with a particular object. For example, the application launcher module 366 can be configured to present a list of applications associated with an object to the user of the mobile device and the user can select an application that the user would like to launch. The application launcher module 366 can also be configured to automatically select an application from the list of applications associated with the object based on a user profile and/or a usage profile of the user of the mobile device 120. The user profile and/or usage profile of the user of the mobile device 120 may also include information such as the most used applications and/or types of applications and/or the most recently used applications and/or types of applications. For example, if the user profile of the user indicates that the user prefers certain types of applications, such as certain types of games, the application launcher module 366 can be configured to automatically select the types of games preferred by the user over other types of applications associated with an object. The application launcher module 366 can also be configured to select an application based on a usage profile of the user on the mobile device 120. For example, if the usage pattern associated with the user of the mobile device 120 indicates that the user does not typically play games but does use applications that provide discount or sale information to the user, the application launcher module 366 can be configured to select an application that provides such discount or sale information to the user of the mobile device 120 over a game application.

The application launcher module 366 can also be configured to select an application to launch based on the purchase and/or download history of the user of the mobile device. The application launcher module 366 can select a type of application that the user of the mobile device 120 typically uses over other types of application that are associated with an object. The application launcher module 366 can also be configured to use location data to determine which applications to select for the user of the mobile device 120. For example, the application launcher module 366 can be configured to use GPS and/or other SPS data and/or other location data to determine which applications to select. For example, the applications launcher module 366 can be configured to select applications that include content localized for a geographic area associated with the location of the mobile device.

The application acquisition module 368 can be configured to acquire an application associated with an object if the application is not already available on the mobile device 120. The application acquisition module 368 can be configured to access an application server associated with the mobile device that provides applications that can be executed on the mobile device. The application acquisition module 368 can also be configured to download and install the application automatically from the application server and to notify the application launcher module 366 that the application is now available to be launched on the mobile device 120. The application launcher module 366 may automatically launch the application after such notification. The application acquisition module 368 can also be configured to provide an interface that allows the user to enter payment details and/or other information, such as an email address, phone number, or other information associated with the user that may be requested by an application publisher before a user may download the application. Further, the application acquisition module 368 may be configured to cause an interface to be displayed, for example using the display 225, which allows the user to acquire the application. For example, the interface may be a confirmation screen that requires the user to acknowledge that a new application is being downloaded, or the interface may be a link to the application or to a list of applications that may all be launched automatically upon selection by the user. In some embodiments, the interface is an interface displayed by an application store after the application acquisition module 368 directs the device to that store.

Figure 4:
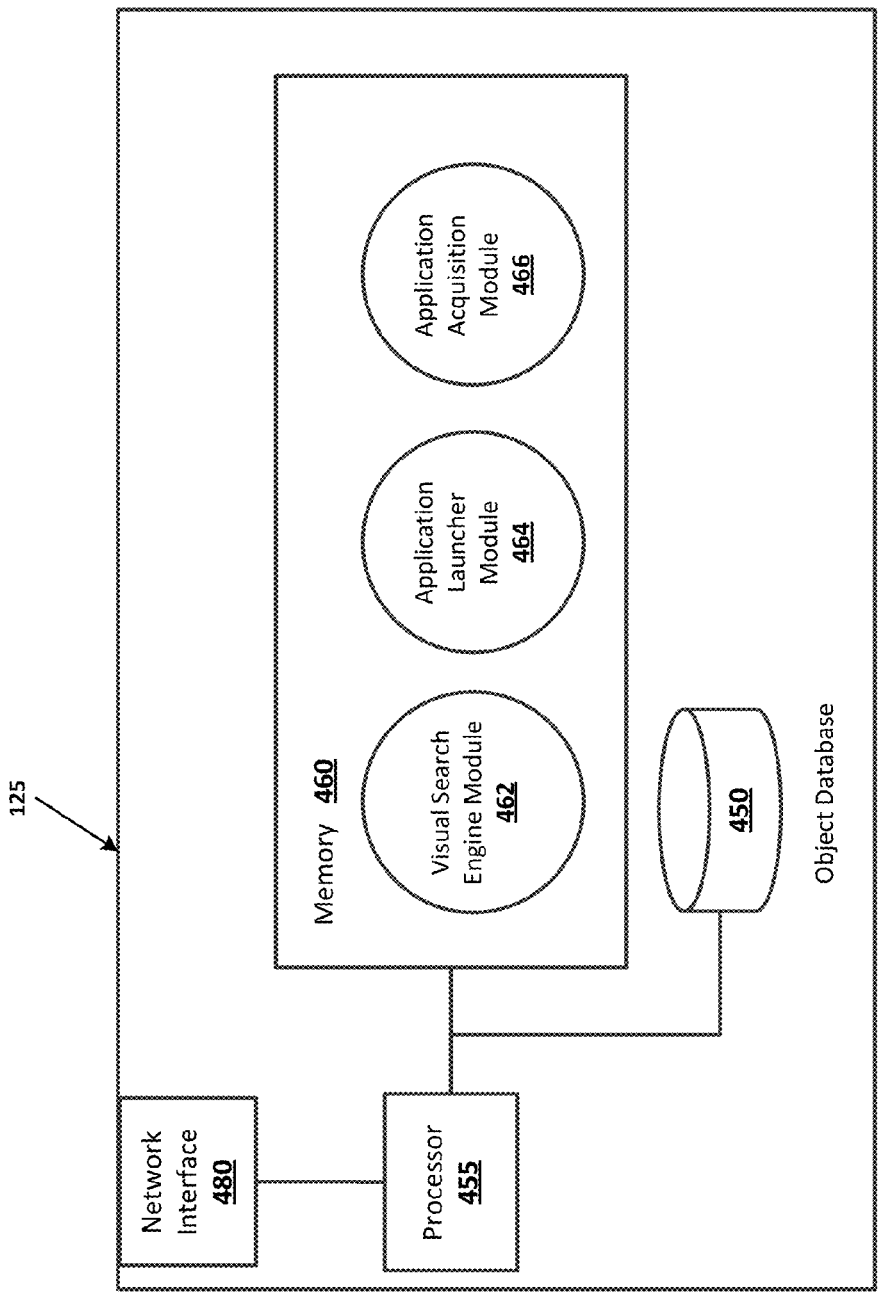
FIG. 4 is a functional block diagram of a computer system that can be used to implement the visual search server illustrated in FIG. 1.

FIG. 4 is a functional block diagram of a computer system that can be used to implement the visual search server 125 illustrated in FIG. 1. The visual search server 125 of FIG. 4 can be used to implement some or all of the stages of the processes illustrated in FIGS. 10 and 12-16. In some implementations, the functions of the visual search server 125 can be combined with the functions of the application portal server 145 illustrated in FIG. 11. The visual search server 125 can include a processor 455, a network interface 480, a memory 460, and an object database 450. The visual search server 125 can also include functional modules that can be implemented as processor executable software code stored in memory 460. The functional modules illustrated in FIG. 4 can alternatively be stored either in part or in whole in a different computer-readable memory. For example, the functional modules may be stored in a removable computer-readable medium associated with the visual search server 125, such as a flash memory, a SD-Card, or other type of removable memory. The functional modules illustrated in FIG. 4 can also be implemented in part or in whole in firmware and/or hardware. The visual search server 125 can include a visual search engine module 462, an application launcher module 464, and an application acquisition module 466. The visual search engine module 462, the application launcher module 464, and/or the application acquisition module 466 can alternatively be implemented by a general purpose processor or CPU, such as processor 455, and/or in other hardware rather than being implemented as processor-executable program code in the memory 460.

The processor 455 can be configured to execute software code stored in the memory 460. For example, the processor 455 can be configured to execute the software code associated with the visual search engine module 462, the application launcher module 464, and the application acquisition module 466. The processor 455 can also be configured to execute other software code used by the server 125, such as operating system components, software drivers for peripheral devices, and/or other software code that may be executed by the visual search server 125 but the description of which is not required to understand the operation of the systems and methods disclosed herein.

The network interface 480 can be configured to provide bidirectional wireless and/or wired network communications to the visual search server 125. The network interface 480 can be configured to allow the visual search server 125 to communicate with mobile devices 120 via one or more intermediate networks, such as the Internet, a wireless network service provider's core network, one or more wireless local area networks (WLANs), and/or other types of network. The network communications between the network interface 480 of the visual search server 125 and the mobile devices 120 and/or the application portal server 145 may be routed through one or more other network elements, such as wireless access point 115 or base station 140.

The memory 460 can comprise volatile and/or persistent memory for storing data used by various components of the visual search server 125. The memory 460 can be used to store processor-executable program code for one or more of the processors included in the visual search server 125, such as processor 455.

The visual search engine module 462 can be configured to operate similarly to the image identification module 364 included in the mobile device 120. The visual search engine module 462 can be configured to identify an object included in an image or in video content captured by the camera 215 of the mobile device 120 and sent to the visual search server 125 by the mobile device 120. The visual search engine module 462 can be configured to automatically attempt to identify objects in an image received from the mobile device 120, or the visual search engine module 462 can be triggered when an icon, symbol, or other markings on an object is recognized by the visual search engine module 462. The visual search engine module 462 can be configured to recognize certain icons, symbols, or other markings that indicate that an object on which the icon, symbol, or other marking is visible is associated with one or more applications that can be executed on a mobile device 120. The visual search engine module 462 can be configured such that the icon, symbol, or other marking associated with a real-world object does not convey any information that identifies the object and/or applications associated with the object, but instead, the icon, symbol, or other marking notifies the visual search engine module 462 that there are one or more applications associated with that object. The mappings between an object and/or object type can instead be determined by application developers when making application content available for mobile devices 120 via the application portal server 145.

The visual search engine module 462 can also be configured to receive images and/or attributes and/or features extracted from images of objects from the mobile device 120. The visual search engine module 462 can be configured to use the attributes and/or features extracted from images of objects in addition to or instead of the images when identifying the objects in the images. The visual search engine module 462 can be configured to use the attributes and/or features that the visual search engine module 462 has extracted from an image or has received from the mobile device 120 to compare to contents in the object database 450 to identify an object or type of object in the image captured from the mobile device 120.

The visual search engine module 462 can be configured to compare the information and/or attributes extracted from the image with the contents of the object database 450 to identify the object in the image and to identify which, if any, applications are associated with the object in the image. The visual search engine module 462 can be configured to use various techniques for identifying an object or type of object in an image received from the mobile device 120 by extracting information and/or attributes of the object from an image of the object. For example, the visual search engine module 462 can use technique similar to those described above with respect to the image identification module 364, such as one or more methods for object recognition that use natural feature descriptors to describe an object and that search for similar features in an image of an object to attempt to identify the object, including the SIFT, SURF, and BRIEF techniques as well as other object recognition techniques. The visual search engine module 462 can be configured to identify an object or type of object in an image when more than a threshold number of features associated with a known object match features in an image received from the mobile device 120.

The object database 450 can be organized into an efficient search data structure, such as a search tree, hash table, or other type of search data structure, such that the visual search engine module 462 can identify a single object from the object database 450 that is most likely to represent the object in the image received from the mobile device 120.

The visual search engine module 462 can be configured to provide the identity of the object and/or object type information to the mobile device 120 and the mobile device 120 can use that information to obtain applications associated with that object and/or object type from the application portal server 145. In some implementations, the visual search engine module 462 can be configured to provide the identity of the object and/or or object type information to the application launcher module 464 which can be configured to launch one or more applications on the mobile device 120 and/or to coordinate the downloading of application content to the mobile device 120 from the application server portal 145.

The application launcher module 464 can be configured to cause an application to be launched on the mobile device responsive to the visual search engine module 462 identifying an object and/or an object type in an image received from a mobile device 120. The application launcher module 464 can be configured to send a request to the application portal server 145 for a list of applications associated with a particular object and/or object type. The application launcher module 464 can be configured to coordinate downloading the identified application content to the mobile device 120 and/or launching one or more of these applications on the mobile device 120.

The application launcher module 464 can be configured to send a query to the mobile device 120 to determine whether the mobile device 120 already has the one or more applications identified by the application portal server 145 available on the mobile device. The application launcher module 464 can be configured to instruct the application acquisition module 466 to acquire the application from the application portal server 145 if the application is not already available on the mobile device 120.

The application acquisition module 466 can be configured to acquire an application that is not already available on a mobile device 120 and to provide the application to the mobile device 120. For example, the application acquisition module 466 can be configured to download the application from the application portal server 145 and to push the application to the mobile device 120 over a network connection. The application acquisition module 466 can also be configured to send a command to the mobile device 120 to cause the mobile device 120 to download the application from the application portal server 145 to the mobile device 120.

The application launcher module 464 can be configured to prompt a user of the mobile device for permission before downloading and/or launching any applications on the mobile device 120. In some implementations, the application launcher module 464 can be configured to prompt the user of the mobile device 120 with a list of the one or more applications identified by the application portal server 145 as being related to the object and/or object type of the image captured by the mobile device 120. The application launcher module 464 can be configured to send an instruction to the mobile device 120 to display the list of one or more applications to the user of the mobile device. The mobile device 120 can be configured to provide a user interface that allows the user to select which application content (if any) that the user would like to download to the mobile device and which (if any) of the applications that the user would like to launch on the mobile device 120.

The application launcher module 464 can also be configured to automatically select an application from the list of applications associated with the object and/or object type for download and/or launch on the mobile device 120 based on a user profile and/or a usage profile of the user of the mobile device 120. The application launcher module 464 can be configured to request the profile information from the mobile device 120 and/or can be configured to obtain this information from the network service provider associated with the mobile device 120. For example, if the user profile of the user indicates that the user may include information that indicates that the user prefers certain types of applications, such as certain types of games, the application launcher module 464 can be configured to automatically select the types of games preferred by the user over other types of applications associated with an object.

The application launcher module 464 can also be configured to select an application based on a usage profile of the user on the mobile device 120. For example, if the usage pattern associated with the user of the mobile device 120 indicates that the user does not typically play games but does use applications that provide discount or sale information to the user, the application launcher module 464 can be configured to select an application that provides such discount or sale information to the user of the mobile device 120 over a game application. The application launcher module 464 can also be configured to select an application to launch based on the purchase and/or download history of the user of the mobile device. The application launcher module 464 can select a type of application that the user of the mobile device 120 typically uses over other types of application that are associated with an object. Information regarding the usage pattern and/or usage history of a user of the mobile device 120 can be sent by the mobile device 120 and/or could be maintained and acquired from other sources. For example, the wireless services provider associated with the mobile device 120 could maintain this information. An application store that sells applications that can be used on the mobile device 120 may also have information regarding the applications and/or types of applications that the user of the mobile device 120 has purchased or downloaded in the past.

FIG. 11 is a functional block diagram of a computer system that can be used to implement the application portal server 145 illustrated in FIG. 1. The application portal server 145 can include a processor 1155, a network interface 1180, a memory 1160, and an application database 1150. The application portal server 145 can be configured to allow application developers to register their applications, to allow the application developers to associate their application with particular features or descriptors and/or objects, and to allow the mobile device 120 and/or the visual search server 125 to acquire an application based on features or descriptors and/or identities of objects identified in an image. In some implementations, some of all of the functions of the application portal server 145 may be combined with those of the visual search server 125 on one or more servers.

The application portal server 145 can also include functional modules that can be implemented as processor executable software code stored in memory 1160. The functional modules illustrated in FIG. 11 can alternatively be stored either in part or in whole in a different computer-readable memory. For example, the functional modules may be stored in a removable computer-readable medium associated with the application portal server 145, such as a flash memory, a SD-Card, or other type of removable memory. The functional modules illustrated in FIG. 11 can also be implemented in part or in whole in firmware and/or hardware. The application portal server 145 can include an application request module 1162, an application launcher module 1164, an application acquisition module 1166, and an application registration module 1168. The visual search engine module 1162, the application launcher module 1164, the application registration module 1168, and/or the application acquisition module 1166 can alternatively be implemented by a general purpose processor or CPU, such as processor 1155, and/or in other hardware rather than being implemented as processor-executable program code in the memory 1160.

The processor 1155 can be configured to execute software code stored in the memory 460. For example, the processor 1155 can be configured to execute the software code associated with the visual search engine module 1162, the application launcher module 1164, the application acquisition module 1166, and the application registration module 1168. The processor 1155 can also be configured to execute other software code used by the application portal server 145, such as operating system components, software drivers for peripheral devices, and/or other software code that may be executed by the application portal server 145 but the description of which is not required to understand the operation of the systems and methods disclosed herein.

The network interface 1180 can be configured to provide bidirectional wireless and/or wired network communications to the application portal server 145. The network interface 1180 can be configured to allow the application portal server 145 to communicate with the mobile devices 120 via one or more intermediate networks, such as the Internet, a wireless network service provider's core network, one or more wireless local area networks (WLANs), and/or other types of network. The network communications between the network interface 1180 of the application portal server 145 and the mobile devices 120 may be routed through one or more other network elements, such as wireless access point 115 or base station 140.

The memory 1160 can comprise volatile and/or persistent memory for storing data used by various components of the application portal server 145. The memory 1160 can be used to store processor-executable program code for one or more of the processors included in the application portal server 145, such as processor 1155.

The application request module 1162 can be configured to receive requests for application information and for application content from the mobile device 120 and/or the visual search server 125. The application request module 1162 can be configured to receive a request for a list of applications related to a particular object and/or object type from the mobile device 120 and/or the visual search server 125. Responsive to such a request, the application request module 1162 can be configured to search the application database 1150 for applications associated with the object and/or object type identified in the request from the mobile device 120 or the visual search server 125. The application database 1150 can be configured to store application information provided by application developers. The application information can associate an application with particular objects and/or types of objects. The application request module 1162 can create a list of applications associated with the object and/or object type included in the request for application information and can be configured to send the list to the requesting entity (e.g., the mobile device 120 or the visual search server 125). The list of applications can include a unique application identifier associated with each application on the list. The application identifier can be used by the mobile device 120 and/or the visual search server 125 to request application content associated with a particular application from the application portal server 145.

The application request module 1162 can also be configured to receive requests for application content from the mobile device 120 and/or the visual search server 125. The request can include the unique application identifier associated with one or more applications and can include device specific information associated with the mobile device. The device specific information associated with the mobile device can include manufacturer information for the mobile device, operating system versions, and/or other information that the application request module 1162 can use to retrieve an appropriate version of the application content from the application database 1150. The application request module 1162 can be configured to send the requested application content to the mobile device 120 or to the visual search server 125.

The application management module 1164 can be configured to allow an application developer to register an application with the application launch service. The application management module 1164 can be configured to provide a user interface that allows the application developer to register with the application launch service and to upload new applications to the application portal server 145 and/or manage information associated with an application already uploaded to the application portal server 145. The application management module 1164 can be configured to allow the application developer to associate their application with particular objects and/or object types.

The object type information can include particular qualities, semantic descriptions, features and/or descriptors associated with the type of object that the application developer would like to associate with an application In some implementations, applications can also be associated with certain object types rather than being associated with a particular identified object. In such an implementation, the vendors or publishers of an application could provide a set of qualities, types, groups, or descriptions associated with the application, and when an object of that type is identified by either the mobile device 120 and/or the server 125, the application can be selected from the object database 450. In some embodiments, the application developer may directly identify features, descriptors, and/or keypoints that are associated with an application. Thus, in some embodiments, attributes of an object extracted from an image may be used to determine an application. In other embodiments, as described above, such attributes may be used to first identify an object, and then an application may be identified based on the identified object.

In some implementations, multiple hierarchical levels of information can be associated with an application, and the application launcher modules of the mobile device 120 and the visual search server can use this information to determine which applications to download and/or launch on a mobile device 120. The application launcher modules of the mobile device 120 and the visual search server can use this information to determine which order to sort a list of applications to be presented to the user of the mobile device. For example, an application with content associated with the Empire State Building could be associated with the Empire States building as the object, but could also be associated with historical landmarks of New York City, and/or skyscrapers and other locations providing viewing platforms in Manhattan.

The application registration module can be configured to update the application database with the features or descriptors and/or objects to be associated with the application provided by the application developer. The application management nodule 1164 can be configured to assign a unique application identifier to each application registered with the launch service. The application identifier can be used to reference the application and to retrieve data associated with the application.

The application database 1150 provides persistent data storage for application data. The application database 1150 can be implemented in persistent computer-readable storage in the application portal server 145 and/or as external persistent computer-readable storage accessible by the application portal server 145. The application database 1150 can be configured to store application data associated with an application and can be configured to allow the application data to be accessed using the unique application identifier associated with each application. The application database 1150 can be configured to receive application data from the application management user interface provided by the application management module and store executable application code and/or features or descriptors and/or objects to which the application is to be associated.

The application database 1150 can be configured to store multiple versions of an application configured to operate on different types of mobile devices having different types and/or version of operating systems. The application request module 1162 can be configured to receive a request for a particular version of the executable application code and to provide that version of the executable application code (if available) to the mobile device 120 and/or the visual search server 125.

FIG. 5 is a block flow diagram of a process for managing applications associated with a mobile device. The process illustrated in FIG. 5 can be implemented by the mobile device 120. However, some or all of the stages of the process illustrated in FIG. 5 can be implemented either in whole or in part by the server 125.

The process illustrated in FIG. 5 can be initiated in various ways. In some instances, the process illustrated in FIG. 5 can be initiated by activation of an icon on a application launcher user interface displayed by the mobile device 120. In some implementations, the process illustrated in FIG. 5 could be launched by pressing a button on the mobile device 120. For example, the process illustrated in FIG. 5 could be triggered by pressing a button on the mobile device that triggers the camera 215 of the mobile device 120 to capture an image of an object. In some embodiments, while the user is viewing a camera interface, for example with a video feed, the user may select a button or icon that will identify applications for objects viewable in the video feed. In some implementations, the mobile device 120 can also include an augmented reality interface in which the mobile device 120 displays an image or video of the field of view of the camera 215 of the mobile device, and the user can select an object by touching or pointing to that object. In some implementations, the process illustrated in FIG. 5 can be triggered by a process that is continually running on the mobile device 120 to automatically identify objects within the field of view of the camera 215 and to attempt to identify applications associated with those object. For example, the latter example could be implemented in a mobile device 120 that includes a HMD for the display 225 and the camera 215 is mounted on the HMD. The mobile device 120 can be configured to automatically attempt to identify objects within the field of view of the camera 215 when the user of the mobile device faces an object.

The process can begin with an image of an object being captured by the camera 215 associated with the mobile device 120 (stage 505). The image capture module 362 of the mobile device 120 can be triggered to capture an image of an object within the field of view of the camera 215 associated with the mobile device. The image capture module 362 can be configured to capture video or a series of images using the camera 215 and to display the captured content on the display 225. The capturing of the image of the object can be triggered by a user of the mobile device 120. For example, the mobile device 120 can be configured to capture an image within the field of view of the camera 215 associated with the mobile device 120 in response to the user of the mobile device 120 issuing a command to capture an image by pressing a button on the mobile device 120, by activating the touch sensor 235 by touching a portion of the display 225, by issuing a voice command to the mobile device 120, and/or by issuing a command to the mobile device through other techniques. The capturing of the image of the object can also be automatically triggered by the mobile device 120. For example, the mobile device 120 can be configured to include an application that can cause the mobile device 120 to display a view captured by camera 215 of the mobile device of a scene within the field of view of the camera 215. The application can be an application designed for capturing photos and/or video content. The application can be an application that is configured to overlay augmented-reality content over a real-world scene. The application can be configured to periodically provide images captured by the camera 215 to the image identification module 364 of the mobile device 120 for processing.

The process can continue with identifying the object and/or type of object in the image of the object captured by the camera 215 associated with the mobile device 120 (stage 510). The image identification module 364 of the mobile device can be configured to identify the object and/or type of object in the image using the various techniques described above. For example, the object and/or type of object in the image can be identified by comparing attributes and/or features extracted from the image of the object in the image with attributes and/or features of identified objects stored in an object-application database either stored on the mobile device 120 or on the visual search server 125. Attributes and/or features of the object in the image to identify the object, such as the ratio of the height and the width of the object, the color or colors of the object, the shape of the object, the size of the object, and/or attributes of the object can be used to identify the object. The image identification module 364 can use various techniques for identifying the object and/or type of object in an image. For example, the image identification module 364 can use one or more methods for object recognition that use natural feature descriptors to describe an object and that search for similar features in an image of an object to attempt to identify the object, such as the SIFT, SURF, and BRIEF techniques, and other object recognition techniques.

The process can continue with identifying an application or applications associated with the object and/or object type identified in the image captured by the camera 215 (stage 515). The image identification module 364 can be configured to identify an application associated with the object using the information stored in the application database 350. In some implementations, the image identification module 364 can also be configured to send a request to the application portal server 145 for a list of applications associated with a particular object or object type. The image identification module 364 can be configured to send a request to the application portal server 145 for a list of applications associated with a particular object or object type if no matches are found in the object-application database 355 on the mobile device. In some implementations, the image identification module 364 can be configured to always send a request to the application portal server 145 for a list of applications associated with a particular object or object type identified by the image identification module 364.

The process can continue with automatically launching an application associated with the object on the mobile device (stage 520). Once an application or applications associated with an object and/or object type have been identified, an application associated with the object and/or object can be launched on the mobile device 120 by the application launcher module 366. As described above, if multiple applications are associated with an object, the user of the mobile device can be prompted for input as to which application that the user would like to download and/or to launch on the mobile device 120. Alternatively, an application can be automatically selected from the multiple applications associated with an object by either the mobile device 120 or the server 125. The automatic select of the application can be based on a usage profile associated with the mobile device or a user profile associated with the user of the mobile device. In some implementations, the application can be launched on the mobile device 120 with the assistance of the application launcher module 464 of the visual search server 125. The application launcher module 464 can send a query to the mobile device 120 to determine whether the application is already available on the mobile device 120 and/or can be configured push the appropriate executable application content for the mobile device 120 to the mobile device 120.

FIG. 6 is a block flow diagram of a process for identifying an object in an image of the object captured using a camera 215 associated with a mobile device 120. The process illustrated in FIG. 6 can be used to implement stage 510 of the process illustrated in FIG. 5. The process illustrated in FIG. 6 can be implemented by the mobile device 120. Alternatively, stages 605, 610, and 630 can be implemented by the server 125, which can be configured to identify the object in the image and identify one or more applications associated with the object.

The process can begin with identifying attributes of the object in the image (stage 605). The image identification module 364 of the mobile device 120 can be configured to apply one or more techniques that use natural feature descriptors to describe an object, such as the SIRF or BRIEF techniques, can be used to identify natural features of an object in the image that can be used to try to determine the identity of the object and/or the type of object included in the image.

The process continues with comparing the attributes of the object identified in stage 605 with the attributes of objects stored in the object database 350 (stage 610). The image identification module 364 can compare the attributes of the object identified in the image with the contents of the local object database 350 stored on the mobile device 120 in an attempt to identify the object in the image or a type of object associated with the object. The process continues with the image identification module 364 determining whether a match for the object in the image was found in the object-application database (stage 615). The match may comprise an object and/or an object type. For example, an image of a the Empire State Building might be matched with to the object type "Empire State Building" and/or may be matched with an object type of "building" or "structure." A match for an object in the image can be determined by comparing attributes of the object in the image with attributes of the objects in the object database 350. The object database 350 can be arranged in an efficient search data structure, such as a search tree, hash table, or other type of search data structure, and determining a match for the object in the image can include traversing the efficient search data structure to select an object from the object database 350 that best matches the attributes of the object in the image captured by the camera 215 of the mobile device 120.

If a match is found in the object-application database, object information identifying the object in the image can be retrieved from the object-application database (stage 630). If no match was found in the local object database 350 of the mobile device 120, the image identification module 364 of the mobile device 120 can be configured to send a request to the visual search server 125 to identify the object in the image (stage 620). The request to the visual search server 125 can include a copy of the image and/or the attributes and/or features of the image identified in stage 610.

The mobile device can then receive object identification information from the visual search server 125 (stage 625). The object identification information can include information that identifies the object and/or object type that was captured in the image received from the mobile device 120.

If no matching object could be found by the server 125, the object information returned from the visual search server 125 can indicate that no match was found by the visual search server 125. If no match was found by the visual search server 125, the image identification module 364 of the mobile device 120 can be configured to provide an indication to the user of the mobile device that the object or type of object in the image could not be identified. For example, the image identification module 364 of the mobile device 120 can be configured to display an augmented-reality overlay on the object that indicates that the object cannot be identified, such as a displaying a question mark icon over the object. The image identification module 364 of the mobile device 120 can also be configured to prompt the user to attempt to capture another image of the object using the mobile device 120. The image identification module 364 of the mobile device 120 may prompt the user to attempt to capture another image of the object, because ambient lighting conditions (e.g., shadows on the object or poor lighting), the angle at which the object was captured, or other factors could affect the ability of the mobile device 120 or the server 125 to accurately extract the attributes of the object from the image of the object.

In some implementations of the process illustrated in FIG. 6, the image identification module 364 of the mobile device 120 can be configure to skip stages 605, 610, 615, and 630, and the image identification module 364 can instead proceed to stages 620 and 625 of the process. In such an implementation, the mobile device 120 may not have the processing power or other resources required to perform the object identification and requests the visual search server 125 perform the identification process.

FIG. 7 is a block flow diagram of a process for identifying an application associated with an object identified in an image of the object captured by a camera associated with a mobile device. The process illustrated in FIG. 7 can be used to implement stage 515 of the process illustrated in FIG. 5. The process illustrated in FIG. 7 can be implemented by the mobile device 120.

The process begins with searching the object-application database to determine whether an object identified in an image is associated with any applications (stage 705). The image identification module 364 of the mobile device 120 can be configured to search the local object-application database 355 to determine whether there are any applications associated with the object and/or object type identified in the image captured by the camera 215. The object-application database 355 can be organized by object and/or object type and can include one or more applications associated with each object and/or object type. The object-application database 355 can be configured to store a unique application identifier for each application associated with an object and/or object type. The unique application identifier can be used to request the application content from the application portal server 145.

A determination can be made by the image identification module 364 whether a match was found in the local object database 350 (stage 710). If a match is found, the image identification module 364 application information can be retrieved from the object-application database 355 (stage 725). The object-application database 355 can provide a unique application identifier associated with each of the applications. The image identification module 364 can provide the application identification information to the application launcher module 366, and the application launcher module 366 can be configured to acquire application content from the application portal server 145 (if not already available on the mobile device) and to launch one or more applications.

If no match is found for an object and/or object type in the local object-application database 355, the mobile device 120 can be configured to send a request to the application portal server 145 for the application information for applications associated with the object identified in the image (stage 715). The mobile device 120 can then receive the application information from the server (stage 720). The request to the application portal server 145 can include information about the hardware and/or operating system version of the mobile device 120 that the application portal server 145 can use when determining whether there is any application content available for the mobile device 120. If no match was found by the application portal server 145, the mobile device 120 can be configured to provide an indication to the user of the mobile device that the object in the image does not currently have any applications associated with that object and/or no application content available for the hardware and/or operating system version of the mobile device 120. If the application portal server 145 finds a match for an object and/or object type, the application portal server 145 can be configured to send to the mobile device 120 an application identifier for each of the applications that match the object and/or object type. The application portal server 145 can also be configured to send additional information about the applications for which a match was found, such as application descriptions, thumbnail images, and/or other content associated with the applications. The application portal server 145 can also be configured to send executable program content to the mobile device 120 in response to the request for applications matching the object and/or object type.

An object and/or object type may have had one or more applications associated with the object in the past, but the publishers of the applications may have only associated the applications with objects for a limited period of time. For example, an application may have been associated with the object for a limited promotional period, and once the limited promotional period has elapsed, the application may have been disassociated with the object by removing the association between the object and the application from the object-application database. An application may also no longer be available due to the application being removed from the application server. The mobile device 120 can be configured to provide an augmented reality overlay for the object that indicates that no applications could be found for the object. For example, the mobile device 120 can be configured to overlay an "X" icon over an object that has been identified but there are no applications associated with that object.

FIG. 8 is a block flow diagram of a process for launching an application on a mobile device. The process illustrated in FIG. 8 can be used to implement stage 520 of the process illustrated in FIG. 5. The process illustrated in FIG. 8 can be implemented by the mobile device 120. The process begins with application launcher module 366 selecting a candidate application if multiple candidate applications are associated with the object in the image captured by the camera 215 (stage 805). Multiple applications can be associated with an object and one of those applications can be selected to be launched on the mobile device 120. Once a candidate application has been selected, the application launcher module 366 a search for the candidate application on the mobile device 120 can be conducted (stage 810). A selected application associated with an object may already be installed on the mobile device 120. The application launcher module 366 can make a determination whether the application candidate was found on the mobile device 120 (stage 815).

If the application is not available on the mobile device 120, the application launcher module 366 can instruct the application acquisition module 368 of the mobile device 120 to send a request to the application portal server 145, or another application source server on which the application resides, to download the application to the mobile device 120 (stage 820). The mobile device 120 can then receive the application download from the application portal server 145 or the other remote application source server (not shown) (stage 825). The application portal server 145 or the other application source server can be configured to send the application over the network 110 to the mobile device 120. The mobile device 120 can be configured to request payment details and/or other information, such as an email address, phone number, or other information associated with the user that may be requested by an application publisher before a user may download the application and to provide the requested information to the server 125 or the other remote application source server.

If the candidate application was available on the mobile device or has been received from the server 125 or another remote application source server, the application launcher module 366 can be configured to launch the application the mobile device 120 (stage 830). The executable application may be stored in memory 260 or another memory of the mobile device 120, and the processor controller 255 can be configured to execute the processor executable application content stored in the memory 260.

Figure 9:
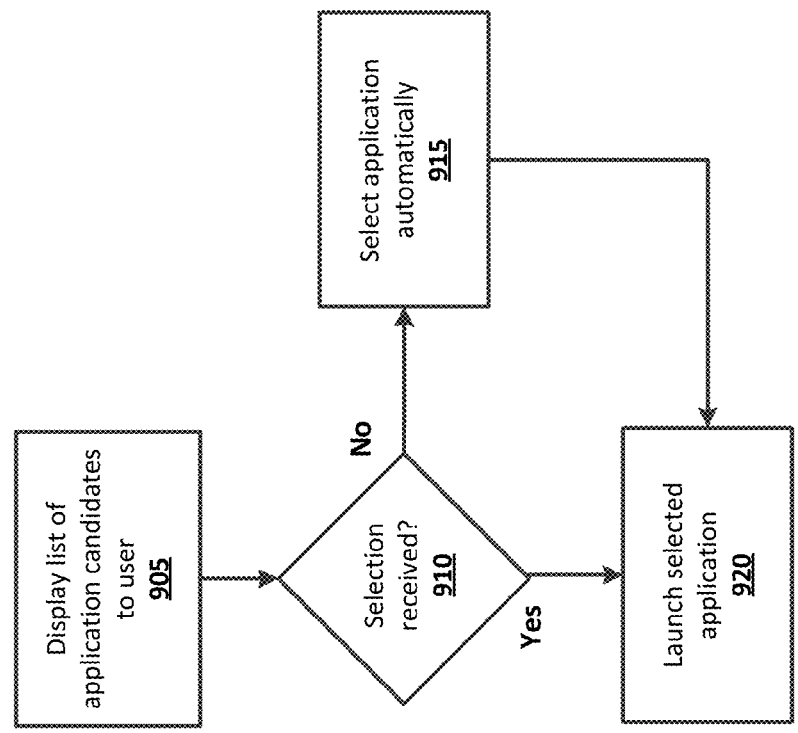
FIG. 9 is a block flow diagram of a process for selecting a candidate application to be launched on a mobile device.

FIG. 9 is a block flow diagram of a process for selecting a candidate application to be launched on a mobile device. The process illustrated in FIG. 9 can be used to implement stage 830 of the process illustrated in FIG. 8. The process illustrated in FIG. 9 can be implemented by the mobile device 120. Alternatively, the steps of the process illustrated in FIG. 9 can be implemented by the visual search server 125 and/or the application portal server 145, where the servers can send a command or series of commands to the mobile device 120 to perform the stages of the process illustrated.

The process illustrated FIG. 9 can be used where there are multiple applications associated with an object and/or object type associated with an image captured by the camera 215 of the mobile device 120. The process can begin the application launcher module 366 displaying a list of application candidates to the user (stage 905) where the application candidates are applications associated with the application. The list of application candidates can be obtained from the object database 350 on the mobile device 120 and/or from the application database 1150 of the application portal server 145. The application launcher module 366 can be configured to display the list of applications on the display 225 of the mobile device, and the mobile device 120 can be configured to receive a user input selecting an application to be launched. The application launcher module 366 can also be configured to provide an option to cancel the launch of an application, and if the user of the mobile device 120 selects the application to cancel the launch of the application, no application associated with the object will be launched on the mobile device 120. A determination can be made by the application launcher module 366 whether the user of the mobile device has selected an application to launch (stage 910). If no selection is received before a predetermined period of time has elapsed or if the device 120 is configured to automatically select an application instead of prompting the user, the application launcher module 366 of the mobile device 120 can be configured to automatically select an application to be launched on the mobile device 120 (stage 915). The application launcher module 366 of the mobile device 120 can be configured to automatically select an application from the list of applications associated with the object based on a user profile and/or a usage profile of the user of the mobile device 120. For example, if the user profile of the user indicates that the user may include information that indicates that the user prefers certain types of applications, such as certain types of games, the application launcher module 366 can be configured to automatically select the types of games preferred by the user over other types of applications associated with an object. The selected application can then be launched on the mobile device 120 (stage 920).

Figure 10:
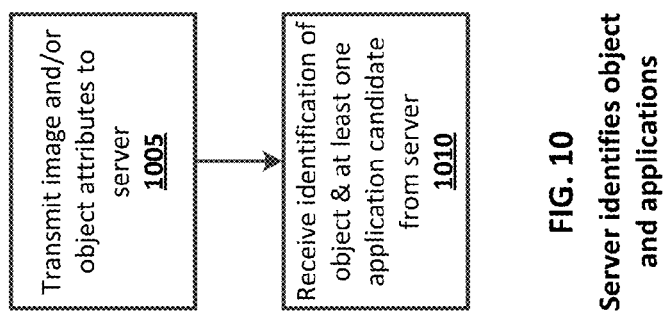
FIG. 10 is a block flow diagram of a process for identifying an object in an image captured by a camera associated with a mobile device and for identifying at least one candidate application associated with the object.

FIG. 10 is a block flow diagram of a process for identifying an object in an image captured by a camera associated with a mobile device and for identifying at least one candidate application associated with the object. FIG. 10 illustrates a process that can be implemented by mobile device 120 and which can be used to implement stages 510 and 515 of the process illustrated in FIG. 5. The process illustrated in FIG. 10 may be performed by the image identification module 364 of the mobile device 120 where the mobile image identification module 364 fails to find a match (an object identity or object type) for an object in an image captured by the camera 215 of the mobile device 120. The process illustrated in FIG. 10 can also be performed by the image identification module 364 of the mobile device to increase confidence in an identification made by the image identification module 364 by obtaining identification results from the visual search server 125 which can then be compared to the search results produced by the image identification module 364 based on the contents of the local object database 350. The method illustrated in FIG. 10 can also be implemented by the mobile device 120 instead of the previously described process where the mobile device 120 defers the identification process to the visual search server 125.

In the process illustrated in FIG. 10, the image identification module 364 of the mobile device 120 can transmit an image captured by the camera 215 associated with the mobile device 120 to the server 125 (stage 1005). The visual search server 125 can be configured to identify the object in the image and provide an object identity and/or object type associated with the object. The visual search server 125 can also be configured to identify at least one application associated with the object and/or object type associated with the object in the image received from the mobile device 120. The image identification module 364 of the mobile device 120 can be configured to receive object information identifying the object in the image and application information identifying any applications associated with the object (if any) (stage 1010). Alternatively, the image identification module 364 of the mobile device can be configured to receive only the application identifiers associated with the object identified by the visual search server 125 and/or the executable application code from the visual search server 125.

If no match is found for the object by the visual search server 125, the image identification module 364 of the mobile device 120 can be configured to prompt the user of the mobile device to recapture the image of the object in case the object could not be identified, for example due to poor image quality. The mobile device 120 can also be configured to provide an augmented-reality overlay over the object that indicates that the object could not be identified or that there were no applications associated with the object.

Figure 12:
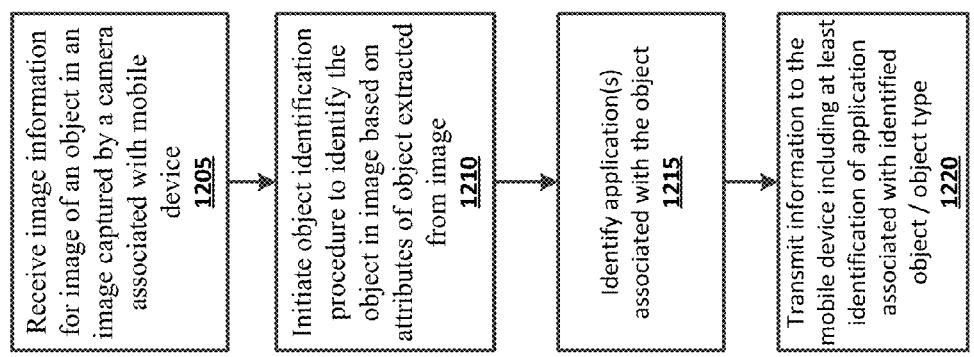
FIG. 12 is a block flow diagram of a process for identifying an object in an image captured using the camera of a mobile device.

FIG. 12 is a block flow diagram of a process for identifying an object in an image captured using the camera of a mobile device. The process illustrated in FIG. 12 can be implemented by the visual search server 125. However, some or all of the stages of the process illustrated in FIG. 12 can be implemented either in whole or in part by the application portal server 145. Furthermore, in some implementations, the visual search server 125 and the application portal server 145 can be implemented by the same server or set of servers. The process discussed in FIG. 12 can be used where the mobile device 120 sends an image of an object captured by the camera 215 of the mobile device 120 to the visual search server for processing to identify the object and/or object type of the object in the image. The process illustrated in FIG. 12 may be invoked where the image identification module 364 of the mobile device 120 is unable to identify an object, to provide a "second opinion" to compare to the results reached by the image identification module 364, or as an alternative to identifying the object on the mobile device 120.

The process can begin with receiving, for example with interface 480, at the visual search server 125 information for an image of an object captured by the camera 215 of the mobile device 120 (stage 1205). The mobile device 120 can be configured to send the image and/or attributes and/or features extracted from the image of the object by the mobile device 120. In some implementations, the attributes and/or features of the object may have already been extracted from the image of the object captured by the mobile device 120 in an attempt to identify the object and/or object type associated with the object in the image. In other implementations, just the image of the object may be provided by the mobile device 120 to the visual search server 125. The image may be provided without attributes and/or features extracted from the image where the mobile device 120 is not configured to perform the image identification process or where a comparison of the identification results between the image identification module 364 and that of the visual search server 125 are desired.

The process can continue with identifying the object and/or type of object in the image of the object captured by the camera 215 associated with the mobile device 120 (stage 1210). The visual search engine module 462 of the visual search server 125 can be configured to identify the object and/or type of object in the image using the various techniques described above. For example, the object and/or type of object in the image can be identified by comparing attributes and/or features extracted from the image of the object in the image with attributes and/or features of identified objects stored in an object database 450. Attributes and/or features of the object in the image to identify the object, such as the ratio of the height and the width of the object, the color or colors of the object, the shape of the object, the size of the object, and/or attributes of the object can be used to identify the object. The visual search engine module 462 of the visual search server 125 can use various techniques for identifying the object and/or type of object in an image. For example, the visual search engine module 462 of the visual search server 125 can one or more methods for object recognition that use natural feature descriptors to describe an object and that search for similar features in an image of an object to attempt to identify the object, such as the SIFT, SURF, and BRIEF techniques, and other object recognition techniques.

The process can continue with identifying an application or applications associated with the object and/or object type identified in the image captured by the camera 215 (stage 1215). The image identification module 364 can be configured to provide the identity of the object and/or the object type information to the application launcher module 464. The application launcher module 464 can be configured to request application information associated with the object and/object type from the application portal server 145. In some implementations, the application launcher module 464 can also be configured to send a request to the application portal server 145 for a list of applications associated with a particular object or object type. In some implementations, stage 1115 is optional and the visual search server 125 is configured to provide only an object identity and/or object type to the mobile device 120 and the mobile device 120 is configured to identify and obtain any applications associated with that object and/or object type.

The process can continue with transmitting, for example with interface 480, information to the mobile device including at least an identification of an application associated with the identified object and/or object type (stage 1220). Once an application or applications associated with an object and/or object type have been identified, the application launcher module 464 can send an application identifier associated with the each of the application and/or applications to the mobile device 120, where the application identifier information was obtained from the application portal server 145 by the application acquisition module 466 of the visual search server 125. In some implementations, the application acquisition module 466 can be configured to download the executable application content from the application portal server 145 and to push the content to the mobile device 120. In yet other implementations, the launcher module 464 can be configured to instruct the application acquisition module 368 of the mobile device 120 to download the identified applications from the application portal server 145.

Figure 13:
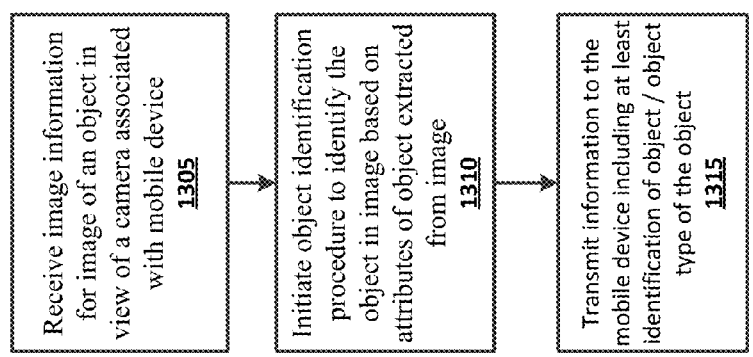
FIG. 13 is a block flow diagram of a process for identifying an object and/or object type associated with an object in an image captured by a camera of a mobile device.

FIG. 13 is a block flow diagram of a process for identifying an object and/or object type associated with an object in an image captured by a camera of a mobile device. The process illustrated in FIG. 13 can be implemented by the visual search server 125. However, some or all of the stages of the process illustrated in FIG. 13 can be implemented either in whole or in part by the application portal server 145. Furthermore, in some implementations, the visual search server 125 and the application portal server 145 can be implemented by the same server or set of servers. The process discussed in FIG. 13 can be used where the mobile device 120 sends an image of an object captured by the camera 215 of the mobile device 120 to the visual search server for processing to identify the object and/or object type of the object in the image. The process illustrated in FIG. 13 may be invoked where the image identification module 364 of the mobile device 120 is unable to identify an object, to provide a "second opinion" to compare to the results reached by the image identification module 364, or as an alternative to identifying the object on the mobile device 120. In the process illustrated in FIG. 13, the mobile device 120 only relies on the visual search server 125 to identify the object and/object type of the object in an image and does not rely on the visual search server 125 to identify and/or acquire any applications associated with that object and/or object type.

The process can begin with receiving, for example with interface 480, at the visual search server 125 information for an image of an object captured by the camera 215 of the mobile device 120 (stage 1305). The mobile device 120 can be configured to send the image and/or attributes and/or features extracted from the image of the object by the mobile device 120. In some implementations, the attributes and/or features of the object may have already been extracted from the image of the object captured by the mobile device 120 in an attempt to identify the object and/or object type associated with the object in the image. In other implementations, just the image of the object may be provided by the mobile device 120 to the visual search server 125. The image may be provided without attributes and/or features extracted from the image where the mobile device 120 is not configured to perform the image identification process or where a comparison of the identification results between the image identification module 364 and that of the visual search server 125 are desired.

The process can continue with identifying the object and/or type of object in the image of the object captured by the camera 215 associated with the mobile device 120 (stage 1310). The visual search engine module 462 of the visual search server 125 can be configured to identify the object and/or type of object in the image using the various techniques described above. For example, the object and/or type of object in the image can be identified by comparing attributes and/or features extracted from the image of the object in the image with attributes and/or features of identified objects stored in an object database 450. Attributes and/or features of the object, such as the ratio of the height and the width of the object, the color or colors of the object, the shape of the object, the size of the object, and/or attributes of the object can be used to identify the object. The visual search engine module 462 of the visual search server 125 can use various techniques for identifying the object and/or type of object in an image. For example, the visual search engine module 462 of the visual search server 125 can use one or more methods for object recognition that use natural feature descriptors to describe an object and that search for similar features in an image of an object to attempt to identify the object, such as the SIFT, SURF, and BRIEF techniques, and other object recognition techniques.

The process can continue with transmitting, for example with interface 480, information to the mobile device including at least an identification of an object and/or object type in the image provided by the mobile device 120 (stage 1315). The visual search engine module 462 can transmit the identity of the object and/or object type to the information to the mobile device if any results were found. Otherwise, the visual search engine module 462 can send a message to the mobile device 120 that the object in the image could not be identified.

Figure 14:
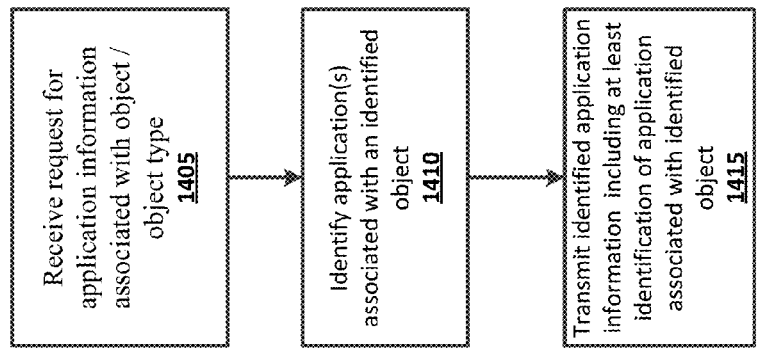
FIG. 14 is a block flow diagram of a process for providing application information associated with an object and/or object type.

FIG. 14 is a block flow diagram of a process for providing application information associated with an object and/or object type. The process illustrated in FIG. 14 can be implemented by the application portal server 145. In some implementations, the visual search server 125 and the application portal server 145 can be implemented by the same server or set of servers. The process discussed in FIG. 14 can be used where the mobile device 120 or the visual search server 125 sends a request for application information associated with a particular object and/or object type and the application portal server 145 can provide a list of applications associated with the object and/or object type identified in the request.

The process can begin with receiving, for example with interface 1180, at the application portal server 145 a request for application information associated with a particular object and/or object type (stage 1405). The application request module 1162 can be configured to receive the request sent by a mobile device 120 or visual search server 125. In some embodiments, attributes of an object extracted from an image such as feature descriptors or keypoints may be received instead or in addition to the information about the particular object and/or object type.

The application request module 1162 can then access the application database 1150 to identify any applications associated with the identified object and/or object type (stage 1410). The application request module 1162 can be configured to create a list of applications associated with the object and/or object type (or object attributes) based on the contents of the application database 1150.

The application request module 1162 can then be configured transmit, for example with interface 1180, the application information to the requesting entity (stage 1415). The application request module 1162 can be configured to transmit the list of applications associated with the object and/or object type to the mobile device 120 or the visual search server 125 that requested the list of applications associated with the object and/or object type.

Figure 15:
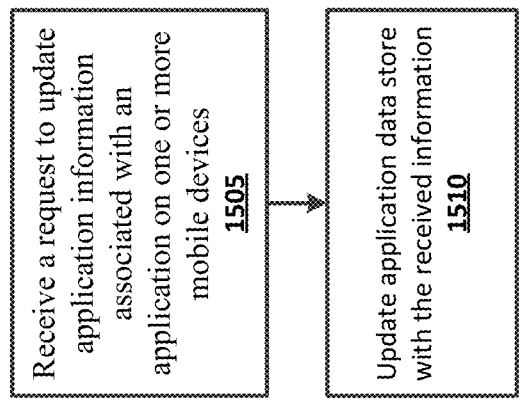
FIG. 15 is a block for diagram of a process for updating application information in an application data store.

FIG. 15 is a block for diagram of a process for updating application information in an application data store. The process illustrated in FIG. 15 can be implemented by the application portal server 145. In some implementations, the visual search server 125 and the application portal server 145 can be implemented on the same server or set of servers. The process discussed in FIG. 15 can be used where an application developer would like to add or modify application content provided by the application portal server 145. The process illustrated in FIG. 15 can be preceded by an authentication process in which an application developer provides authentication credentials before being able to add, update, or remove an application from the application portal server 145.

The method can begin with the application portal server 145 receiving, for example with interface 1180, a request to update application information associated with an application executable on one or more mobile devices (stage 1505). The application management module 1164 of the application portal server 145 can be configured to process the request. The application information can include executable program code for one or more versions of the application configured for specific types of mobile devices and/or versions of operating systems on the mobile devices. The application information can also include a description of the application, thumbnail images associated with the application, and/or other content associated with the application.

The application data store can then be updated with the application information provided with the request (stage 1510). If the request is associated with a new application that is not currently included in the database, the application management module 1164 can be configured to assign a new unique application identifier to the application and update the application database 1150 with the application information provided with the request. If the request is associated with an existing application, the application information associated with that application in the application database 1150 can be updated by the application management module 1164.

Figure 16:
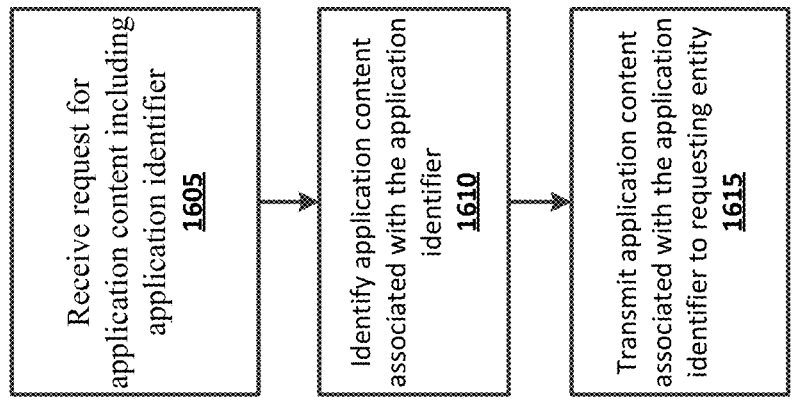
FIG. 16 is a block flow diagram of a process for providing application information associated with a particular application to a mobile device or a visual search server.

FIG. 16 is a block flow diagram of a process for providing application information associated with a particular application to a mobile device or a visual search server. The process illustrated in FIG. 16 can be implemented by the application portal server 145. In some implementations, the visual search server 125 and the application portal server 145 can be implemented on the same server or set of servers. The process discussed in FIG. 16 can be used where the mobile device 120 or the visual search server 125 sends a request for application content associated with a particular application identifier.

The process can begin with receiving, for example with interface 1180, at the application portal server 145 a request for application content associated with a particular application identifier (stage 1605). The application request module 1162 can be configured to receive the request sent by a mobile device 120 or visual search server 125. The application identifier provides a unique identifier that can be used to identify a particular application that may be accessed from the application server portal 145. The application portal server 145 can be configured to perform an authorization step to determine whether the mobile device 120 and/or the visual search server 125 is authorized to access the content before proceeding to look up and/or send the application content to the requesting entity.

The application request module 1162 can then access the application database 1150 to identify any applications associated with the application identifier included in the request (stage 1610). The application request module 1162 can be configured to access the content related to the application using the unique application identifier associated with the requested application.

The application request module 1162 can then be configured transmit, for example with interface 1180, the requested application content to the mobile device 120 or the visual search server 125, depending upon which entity requested the application content (stage 1615). In some implementations, the application request module 1162 can be configured to send executable program code to the mobile device 120 and/or to the visual search server 125 or to send a command to cause the mobile device 120 and/or the visual search server 125 to download the requested content from the application portal server 145. In the event that the request included an invalid application identifier, the application request module 1162 can be configured to send a message to the requesting entity that the application identifier was not valid. In the event that the request included an application identifier associated with content that is no longer available, the application request module 1162 can be configured to send a message to the server that the application identifier is no longer available.

The following example use cases provide some examples that illustrate how the various systems and processes described herein can be used together to provide application content to a mobile device 120. These examples are merely intended to demonstrate how the various processes illustrated herein may be used together to provide application content associated with objects and/or object types to a mobile device 120, and these examples are not intended to be exhaustive or limiting. Other combinations of these processes are possible.

In one example, a mobile device 120 can capture an image of an object and send the image of the object and/or a set of descriptors for the object extracted from the image by the mobile device 120 to the visual search server 125. In some implementations, the mobile device may first attempt to identify the object before sending the image of the object to the visual search server, such as in the process illustrated in FIG. 6 which can be used to implement stage 510 of the process illustrated in FIG. 5. The visual search server 125 can be configured to return the identity of the object and/or object type of the object in the image, such as in the process FIG. 13. The visual search server 125 can be configured to provide features and/or descriptors extracted from the image to the mobile device 120, which the mobile device 120 can send to the application portal server 145 to receive application content associated with those descriptors.

The visual search server 125 can also be configured to provide application information to the mobile device 120 in response to the image of the object and/or a set of descriptors for the object received from the mobile device 120, such as in the process illustrated FIG. 12. The application information provided by the visual search server 125 can include one or more application identifiers for applications associated with the object and/or object type or can include the application content itself. Where the application identifiers are provided to the mobile device 120 by the visual search server 125 (such as in the process illustrated in FIG. 12), the mobile device 120 can be configured to make a determination whether any of the application content is already available on the mobile device and to request any application content not available on the mobile device 120 from the application portal server 145 using the application identifiers provided by the visual search server 125. The application portal server 145 can be configured to receive the application identifiers and to provide the application content associated with those application identifiers to the mobile device 120 (such as in the process illustrated in FIG. 14).

In another example, a mobile device 120 can capture an image of an object and send the image of the object to the visual search server 125 to identify the object. In some implementations, the mobile device may first attempt to identify the object before sending the image of the object to the visual search server 125, such as in the process illustrated in FIG. 6 which can be used to implement stage 510 of the process illustrated in FIG. 5. In other implementations, the mobile device 120 can be configured to send the image of the object to the visual search server 125 for identification without first attempting to identify the object, such as in the process illustrated in FIG. 10. In some implementations, the visual search server 125 can be configured to receive the image of the object, to identify the object, and to send information to the mobile device 120 that includes at least an identification of the object, such as in the process illustrated in FIG. 13. The information provided to the mobile device 120 can include an identification of the object, such as an object identifier and/or a set of descriptors associated with the object in the image captured by the mobile device 120. The mobile device 120 can then be configured to send the object identifier and/or set of descriptors associated with the object in the image to the application portal server 145 and to receive the application content from the application portal server 145. This process is similar to that illustrated in FIG. 14 where the application portal server 145 can be configured to receive application identifiers from the mobile device 120 or the visual search server 125 and to provide the application content associated with those application identifiers to the requesting entity. However, in this example, the application portal server 145 can be configured to receive an object identifier and/or a set of descriptors associated with an object in an image and to identify application content associated with the object and/or object type of the object in the image based on the object identifier and/or a set of descriptors received from the mobile device 120.

In another example, the mobile device 120 can capture an image of an object and send the image of the object to the application portal 145 and/or a set of descriptors for the object extracted from the image by the mobile device 120 to the application portal 145. This process is similar to that discussed in FIG. 12, where the visual search server 125 can be configured to receive image information for an image of an object captured by the camera 215 associated with the mobile device 120, but in the this exemplary use case, the application portal server 145 can be configured to receive the image information from the visual search server 125. The application portal server 145 can then be configured to send the image information received from the mobile device 120 to the visual search server 125. The visual search server 125 may be configured to perform a similar process to that illustrated in FIG. 12 where the image information in stage 1205 is received from the application portal server 145 and the visual search server 125 sends an identification of at least one application associated with the object and/or object type of the object from the image captured by the mobile device to the application portal server 145. The application portal server 145 can be configured to use the identification of the at least one application to provide application content to the mobile device 120. Alternatively, the visual search server 125 can be configured to perform a similar process to that illustrated in FIG. 13 where the image information in stage 1205 is received from the application portal server 145 and the visual search server 125 sends an object and/or object type of the object from the image captured by the mobile device to the application portal server 145. The application portal server 145 can then use the object and/or object type received from the visual search server 125 to look up application content associated with that object and/or object type and to provide the application content to the mobile device.

Other Considerations

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

A wireless communication network does not have all communications transmitted wirelessly, but is configured to have at least some communications transmitted wirelessly.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

Further, more than one invention may be disclosed.

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Such non-transitory computer-readable medium may be implemented by the memory 260 and/or the memory 460. Processors may perform the described tasks; for example one or more of the processors 210, 220, 230, 240, and 455 may be configured to perform one or more of the functions described with respect to FIGS. 5-10 and 12-16.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

What is claimed is:

1. A method for managing applications associated with a mobile device, the method comprising:
   obtaining an image of an object in view of a camera associated with the mobile device;
   identifying a marking displayed on the object in the obtained image, wherein the marking on the object indicates that the object is associated with one or more applications and triggers an object identification procedure to identify the object in the image, followed by an application identification procedure to identify one or more applications associated with the object, wherein the object identification procedure and the application identification procedure are not performed for one or more objects before one or more markings are successfully identified on the one or more objects, and wherein the marking does not identify the object and does not identify the one or more applications;
   performing the object identification procedure to identify the object in the image based on attributes of the object extracted from the image, wherein the object identification procedure is performed in response to successfully identifying the marking displayed on the object, and wherein the object identification procedure comprises comparing the attributes of the object extracted from the image with a plurality of attributes associated with a plurality of known objects and identifying the object as one of the plurality of known objects responsive to the attributes of the object matching more than a threshold number of attributes associated with the one known object;
   conditional upon the object identification procedure successfully identifying the object as the one known object, performing the application identification procedure to identify an application based on a stored mapping between the one known object and the application; and
   automatically launching the application on the mobile device.

2. The method of claim 1 wherein the plurality of attributes associated with the plurality of known objects are stored in a local database on the mobile device.

3. The method of claim 2 wherein the attributes associated with the plurality of known objects stored in the local database are organized into a search tree, and wherein the object identification procedure uses the attributes of the object extracted from the image and the search tree to identify the object.

4. The method of claim 2, further comprising:
   sending the image of the object or the attributes extracted from the image to a visual search engine located on a remote server in response to the object not being successfully identified by comparing the attributes extracted from the image to the plurality of attributes associated with the plurality of objects stored in the local database; and
   receiving an identification of the object from the visual search engine located on the remote server.

5. The method of claim 1 wherein the object identification procedure comprises:
   sending the image of the object or the attributes extracted from the image to a visual search engine located on a remote server.

6. The method of claim 5 wherein the application identification procedure comprises receiving information identifying one or more applications associated with the object from the visual search engine.

7. The method of claim 1 wherein automatically launching the application comprises determining whether the application is installed on the mobile device.

8. The method of claim 7 wherein automatically launching the application on the mobile device comprises:
launching the application if the application is installed on the mobile device; and
displaying an interface for acquiring the application if the application is not installed on the mobile device, and launching the application based on input to the interface if the application is acquired.

9. The method of claim 1, further comprising:
identifying a plurality of candidate applications that are mapped to the one known object; and
selecting the application from the plurality of candidate applications.

10. The method of claim 9 wherein selecting the application from the plurality of candidate applications comprises selecting the application based on a user selection.

11. The method of claim 10, further comprising:
displaying a listing of the plurality of candidate applications; and
prompting a user to provide the user selection from the displayed listing.

12. The method of claim 11 wherein displaying the listing of the plurality of candidate applications comprises ordering the plurality of candidate applications on the listing according to estimated relevance.

13. The method of claim 9 wherein selecting the application from the plurality of candidate applications comprises selecting the application based on a user profile.

14. The method of claim 13, further comprising:
constructing the user profile based on at least one of user input or observed usage patterns of the mobile device.

15. The method of claim 1 wherein the application is an augmented reality application.

16. The method of claim 1, wherein the stored mapping is stored in a local database on the mobile device.

17. The method of claim 1, further comprising:
sending a request to a remote server for updates to content of a local database;
receiving updates to the content of the local database from the remote server; and
updating the local database with the updates.

18. The method of claim 1, wherein the application is also identified based on a usage profile associated with a user of the mobile device, the usage profile being indicative of types of applications preferred by the user of the mobile device.

19. The method of claim 1, wherein the application is also identified by comparing the object with multiple hierarchical levels of information.

20. An apparatus for managing applications associated with a mobile device, the apparatus comprising:
means for obtaining an image of an object in view of a camera associated with the mobile device;
means for identifying a marking displayed on the object in the obtained image, wherein the marking on the object indicates that the object is associated with one or more applications and triggers an object identification procedure to identify the object in the image, followed by an application identification procedure to identify one or more applications associated with the object, wherein the object identification procedure and the application identification procedure are not performed for one or more objects before one or more markings are successfully identified on the one or more objects, and wherein the marking does not identify the object and does not identify the one or more applications;
means for performing the object identification procedure to identify the object in the image based on attributes of the object extracted from the image, wherein the object identification procedure is performed in response to successfully identifying the marking displayed on the object, and wherein the means for performing the object identification procedure comprises means for comparing the attributes of the object extracted from the image with a plurality of attributes associated with a plurality of known objects and means for identifying the object as one of the plurality of known objects responsive to the attributes of the object matching more than a threshold number of attributes associated with the one known object;
means for, conditional upon the object identification procedure successfully identifying the object as the one known object, performing the application identification procedure to identify an application based on a stored mapping between the one known object and the application; and
means for automatically launching the application on the mobile device.

21. The apparatus of claim 20 wherein the plurality of attributes associated with the plurality of known objects are stored in a local database on the mobile device.

22. The apparatus of claim 21, further comprising:
means for sending the image of the object or the attributes extracted from the image to a visual search engine located on a remote server in response to the object not being successfully identified by comparing the attributes extracted from the image to the plurality of attributes associated with the plurality of objects stored in the local database; and
means for receiving an identification of the object from the visual search engine located on the remote server.

23. The apparatus of claim 20 wherein the means for performing the object identification procedure comprises:
means for sending the image of the object or the attributes extracted from the image to a visual search engine located on a remote server.

24. The apparatus of claim 23 wherein the means for performing the application identification procedure comprises means for receiving information identifying one or more applications associated with the object from the visual search engine.

25. The apparatus of claim 20 wherein the means for automatically launching the application comprises means for determining whether the application is installed on the mobile device.

26. The apparatus of claim 25 wherein the means for automatically launching the application on the mobile device comprises:
means for launching the application if the application is installed on the mobile device; and
means for displaying an interface for acquiring the application if the application is not installed on the mobile device, and launching the application based on input to the interface if the application is acquired.

27. The apparatus of claim 20, further comprising:
means for identifying a plurality of candidate applications that are mapped to the one known object; and means for selecting the application from the plurality of candidate applications.

28. The apparatus of claim 27 wherein the means for selecting the application from the plurality of candidate applications comprises means for selecting the application based on a user selection.

29. The apparatus of claim 27 wherein the means for selecting the application from the plurality of candidate applications comprises means for selecting the application based on a user profile.

30. A non-transitory computer-readable medium, having stored thereon computer-readable instructions for managing applications associated with a mobile device, comprising instructions configured to cause a computer to:
obtain an image of an object in view of a camera associated with the mobile device;
identify a marking displayed on the object in the obtained image, wherein the marking on the object indicates that the object is associated with one or more applications and triggers an object identification procedure to identify the object in the image, followed by an application identification procedure to identify one or more applications associated with the object, wherein the object identification procedure and the application identification procedure are not performed for one or more objects before one or more markings are successfully identified on the one or more objects, and wherein the marking does not identify the object and does not identify the one or more applications;
perform the object identification procedure to identify the object in the image based on attributes of the object extracted from the image, wherein the object identification procedure is performed in response to successfully identifying the marking displayed on the object, and wherein the object identification procedure comprises comparing the attributes of the object extracted from the image with a plurality of attributes associated with a plurality of known objects and identifying the object as one of the plurality of known objects responsive to the attributes of the object matching more than a threshold number of attributes associated with the one known object;
conditional upon the object identification procedure successfully identifying the object as the one known object, performing the application identification procedure to identify an application based on a stored mapping between the one known object and the application; and
automatically launch the application on the mobile device.

31. An apparatus for managing applications associated with a mobile device, the apparatus comprising:
a transceiver configured to transmit and receive data wirelessly;
a non-transitory computer-readable memory;
a plurality of modules comprising processor executable code stored in the non-transitory computer-readable memory; and
a processor connected to the non-transitory computer-readable memory and configured to access the plurality of modules stored in the non-transitory computer-readable memory, wherein the plurality of modules include at least:
an image capture module configured to obtain an image of an object in view of a camera associated with the mobile device;
an image identification module configured to identify a marking displayed on the object in the obtained image and to perform an object identification procedure to identify the object in the image based on attributes of the object extracted from the image and to identify an application associated with the object based on the object identification procedure, wherein the marking on the object indicates that the object is associated with one or more applications and triggers the object identification procedure to identify the object in the image, followed by an application identification procedure to identify one or more applications associated with the object, wherein the object identification procedure and the application identification procedure are not performed for one or more objects before one or more markings are successfully identified on the one or more objects, wherein the marking does not identify the object and does not identify the one or more applications, wherein the object identification procedure is performed in response to successfully identifying the marking displayed on the object, wherein the object identification module is configured to compare the attributes of the object extracted from the image with a plurality of attributes associated with a plurality of known objects and to identify the object as one of the plurality of known objects responsive to the attributes of the object matching more than a threshold number of attributes associated with the one known object, and wherein the image identification module is further configured to, conditional upon the object identification procedure successfully identifying the object as the one known object, perform the application identification procedure to identify an application based on a stored mapping between the one known object and the application; and
an application launcher module to automatically launch the application on the mobile device.

32. The apparatus of claim 31 wherein the plurality of attributes associated with the plurality of known objects are stored in a local database on the mobile device.

33. The apparatus of claim 32, wherein the image identification module is further configured to:
send the image of the object or the attributes extracted from the image to a visual search engine located on a remote server in response to the object not being successfully identified by comparing the attributes extracted from the image to the plurality of attributes associated with the plurality of objects stored in the local database; and
receive an identification of the object from the visual search engine located on the remote server.

34. The apparatus of claim 31 wherein the image identification module is further configured to send the image of the object or the attributes extracted from the image to a visual search engine located on a remote server.

35. The apparatus of claim 34 wherein the application identification procedure comprises receiving information identifying one or more applications associated with the object from the visual search engine.

36. The apparatus of claim 31 wherein the application launcher module is further configured to determine whether the application is installed on the mobile device.

37. The apparatus of claim 36 wherein the application launcher module is further configured to launch the application if the application is installed on the mobile device, and wherein the apparatus further comprises an application acquisition module configured to display an interface for acquiring the application if the application is not installed on the mobile device, wherein the application launcher module is configured to launch the application based on input to the interface if the application is acquired.

38. The apparatus of claim 31 wherein the image identification module is further configured to identify a plurality of candidate applications that are mapped to the one known object and to select the application from the plurality of candidate applications.

39. The apparatus of claim 38 wherein the application launcher module is further configured to select the application based on a user selection.

40. The apparatus of claim 38 wherein the application launcher module is further configured to select the application based on a user profile.

41. The apparatus of claim 31 wherein the application is an augmented reality application.

42. A method for providing application content associated with an object or object type, the method comprising:
receiving information related to a request for application content from a mobile device or a visual search server, the information comprising an image of an object;
identifying a marking displayed on the object in the image, wherein the marking on the object indicates that the object is associated with one or more applications and triggers an object identification procedure to identify the object in the image, followed by an application identification procedure to identify one or more applications associated with the object, wherein the object identification procedure and the application identification procedure are not performed for one or more objects before one or more markings are successfully identified on the one or more objects, and wherein the marking does not identify the object and does not identify the one or more applications;
performing the object identification procedure to identify the object in the image based on the information related to the request for the application content, wherein the object identification procedure is performed in response to successfully identifying the marking displayed on the object, and wherein the object identification procedure comprises comparing attributes of the object extracted from the image with a plurality of attributes associated with a plurality of known objects or known object types and identifying the object as one of the plurality of known objects or known object types responsive to the attributes of the object matching more than a threshold number of attributes associated with the one known object or known object type;
conditional upon the object identification procedure successfully identifying the object as the one known object or known object type, performing the application identification procedure to identify an application based on a stored mapping between the one known object or known object type and the application; and
transmitting application content associated with the application to the mobile device or the visual search server.

43. The method of claim 42 wherein the application content comprises a list of applications that are mapped to the one known object or known object type.

44. The method of claim 42 wherein the application content comprises executable application content for the mobile device.

45. The method of claim 42 wherein the image is captured by the mobile device, and wherein the information comprises the attributes of the object extracted from the image.

46. The method of claim 42, further comprising:
receiving, from an application provider, an identifier of the one known object or attributes of the one known object that are extractable from one or more images of the one known object;
receiving, from the application provider, an application associated with the one known object;
storing the identifier or the attributes of the one known object in an application database; and
storing the application in the application database such that the application is mapped to the one known object and can be identified using the stored identifier or the attributes of the one known object.

47. An apparatus for providing application content associated with an object or object type, the apparatus comprising:
means for receiving information related to a request for application content from a mobile device or a visual search server, the information comprising an image of an object;
means for identifying a marking displayed on the object in the image, wherein the marking on the object indicates that the object is associated with one or more applications and triggers an object identification procedure to identify the object in the image, followed by an application identification procedure to identify one or more applications associated with the object, wherein the object identification procedure and the application identification procedure are not performed for one or more objects before one or more markings are successfully identified on the one or more objects, and wherein the marking does not identify the object and does not identify the one or more applications;
means for performing the object identification procedure to identify the object in the image based on the information related to the request for the application content, wherein the object identification procedure is performed in response to successfully identifying the marking displayed on the object, and wherein the means for performing the object identification procedure comprises means for comparing attributes of the object extracted from the image with a plurality of attributes associated with a plurality of known objects or known object types and means for identifying the object as one of the plurality of known objects or known object types responsive to the attributes of the object matching more than a threshold number of attributes associated with the one known object or known object type;
means for, conditional upon the object identification procedure successfully identifying the object as the one known object or known object type, performing the application identification procedure to identify an application based on a stored mapping between the one known object or known object type and the application; and
means for transmitting application content associated with the application to the mobile device or the visual search server.

48. The apparatus of claim 47 wherein the application content comprises a list of applications that are mapped to the one known object or known object type.

49. The apparatus of claim 47 wherein the application content comprises executable application content for the mobile device.

50. The apparatus of claim 47 wherein the image is captured by the mobile device, and wherein the information comprises the attributes of the object extracted from the image.

51. The apparatus of claim 47, further comprising:
means for receiving, from an application provider, an identifier of the one known object or attributes of the one known object that are extractable from one or more images of the one known object;
means for receiving, from the application provider, an application associated with the one known object;
means for storing the identifier or the attributes of the one known object in an application database; and
means for storing the application in the application database such that the application is mapped to the one known object and can be identified using the stored identifier or the attributes of the one known object.

52. A non-transitory computer-readable medium, having stored thereon computer-readable instructions for providing application content associated with an object or object type, comprising instructions configured to cause a computer to:
receive information related to a request for application content from a mobile device or a visual search server, the information comprising an image of an object;
identify a marking displayed on the object in the image, wherein the marking on the object indicates that the object is associated with one or more applications and triggers an object identification procedure to identify the object in the image, followed by an application identification procedure to identify one or more applications associated with the object, wherein the object identification procedure and the application identification procedure are not performed for one or more objects before one or more markings are successfully identified on the one or more objects, and wherein the marking does not identify the object and does not identify the one or more applications;
perform the object identification procedure to identify the object in the image based on the information related to the request for the application content, wherein the object identification procedure is performed in response to successfully identifying the marking displayed on the object, and wherein the object identification procedure comprises comparing attributes of the object extracted from the image with a plurality of attributes associated with a plurality of known objects or known object types and identifying the object as one of the plurality of known objects or known object types responsive to the attributes of the object matching more than a threshold number of attributes associated with the one known object or known object type;
conditional upon the object identification procedure successfully identifying the object as the one known object or known object type, perform the application identification procedure to identify an application based on a stored mapping between the one known object or known object type and the application; and
transmit application content associated with the application to the mobile device or the visual search server.

53. The non-transitory computer-readable medium of claim 52 wherein the application content comprises a list of applications that are mapped to the one known object or known object type.

54. The non-transitory computer-readable medium of claim 52 wherein the application content comprises executable application content for the mobile device.

55. The non-transitory computer-readable medium of claim 52 wherein the image is captured by the mobile device, and wherein the information comprises the attributes of the object extracted from the image.

56. The non-transitory computer-readable medium of claim 52, further comprising instructions configured to cause the computer to:
receive, from an application provider, an identifier of the one known object or attributes of the one known object that are extractable from one or more images of the one known object;
receive, from the application provider, an application associated with the one known object;
store the identifier or the attributes of the one known object in an application database, and
store the application in the application database such that the application is mapped to the one known object and can be identified using the stored identifier or the attributes of the one known object.

57. An apparatus for providing application content associated with an object or object type, the apparatus comprising:
a transceiver configured to receive information related to a request for application content from a mobile device or a visual search server, the information comprising an image of an object;
an application database comprising application content associated with a plurality of applications from a plurality of application providers; and
a processor configured to;
identify a marking displayed on the object in the image, wherein the marking on the object indicates that the object is associated with one or more applications and triggers an object identification procedure to identify the object in the image, followed by an application identification procedure to identify one or more applications associated with the object, wherein the object identification procedure and the application identification procedure are not performed for one or more objects before one or more markings are successfully identified on the one or more objects, and wherein the marking does not identify the object and does not identify the one or more applications;
perform the object identification procedure to identify the object in the image based on the information related to the request for the application content, the object identification procedure is performed in response to successfully identifying the marking displayed on the object, and wherein the object identification procedure comprises comparing attributes of the object extracted from the image with a plurality of attributes associated with a plurality of known objects or known object types and identifying the object as one of the plurality of known objects or known object types responsive to the attributes of the object matching more than a threshold number of attributes associated with the one known object or known object type;
conditional upon the object identification procedure successfully identifying the object as the one known object or known object type, perform the application identification procedure to identify an application based on a stored mapping between the one known object or known object type and the application;

wherein the transceiver is further configured to transmit application content associated with the application to the mobile device or the visual search server.

58. The apparatus of claim 57 wherein the application content comprises a list of applications that are mapped to the one known object or known object type.

59. The apparatus of claim 57 wherein the application content comprises executable application content for the mobile device.

60. The apparatus of claim 57 wherein the image is captured by the mobile device, and wherein the information comprises the attributes of the object extracted from the image.

61. The apparatus of claim 57 wherein the processor is further configured to:
   receive, from an application provider, an identifier of the one known object or attributes of the one known object that are extractable from one or more images of the one known object;
   receive, from the application provider, an application associated with the one known object;
   store the identifier or the attributes of the one known object in an application database; and
   store the application in the application database such that the application is mapped to the one known object and can be identified using the stored identifier or the attributes of the one known object.

* * * * *